(12) United States Patent
Ogihara et al.

(10) Patent No.: US 8,397,047 B2
(45) Date of Patent: Mar. 12, 2013

(54) LOGICAL VOLUME CONFIGURATION INFORMATION DISTRIBUTION PROGRAM, LOGICAL VOLUME CONFIGURATION INFORMATION DISTRIBUTION METHOD, AND LOGICAL VOLUME CONFIGURATION INFORMATION DISTRIBUTION APPARATUS

(75) Inventors: Kazutaka Ogihara, Kawasaki (JP); Tetsutaro Maruyama, Kawasaki (JP); Yoshihiro Tsuchiya, Kawasaki (JP); Masahisa Tamura, Kawasaki (JP); Kazuichi Oe, Kawasaki (JP); Takashi Watanabe, Kawasaki (JP); Tatsuo Kumano, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 329 days.

(21) Appl. No.: 12/714,903

(22) Filed: Mar. 1, 2010

(65) Prior Publication Data

US 2010/0228915 A1     Sep. 9, 2010

(30) Foreign Application Priority Data

Mar. 4, 2009  (JP) .................................. 2009-50614

(51) Int. Cl.
*G06F 12/00*     (2006.01)

(52) U.S. Cl. ............ 711/170; 711/6; 711/105; 711/114; 711/154; 711/161; 711/162; 711/165; 711/171

(58) Field of Classification Search .............. 711/6, 105, 711/114, 154, 162, 165, 170, 171
See application file for complete search history.

(56) References Cited

U.S. PATENT DOCUMENTS

| 7,873,790 B2 * | 1/2011 | Bouchou et al. ............... 711/135 |
| 2003/0061331 A1 | 3/2003 | Nakamura et al. |
| 2005/0235109 A1 * | 10/2005 | Ogihara et al. ............... 711/114 |
| 2007/0255920 A1 * | 11/2007 | Gold ............................ 711/170 |

FOREIGN PATENT DOCUMENTS

| JP | 2003-108420 | 4/2003 |
| WO | 2004/104845 A1 | 12/2004 |

* cited by examiner

*Primary Examiner* — Tuan Thai
*Assistant Examiner* — Zhuo Li
(74) *Attorney, Agent, or Firm* — Staas & Halsey LLP

(57) ABSTRACT

A recording medium storing a logical volume configuration information distribution program causing a computer to execute processing based on logical volume configuration information that defines a correspondence relation between a virtual storage area in a logical volume defined virtually and a real storage area in a storage unit, the logical volume configuration information distribution program includes: when the correspondence relation between the virtual storage area and the real storage area is changed, referencing an access node list storage unit for storing an access node list in which identification information of the access node is registered, and transmitting update information that indicates an updated correspondence relation concerning the virtual storage area whose correspondence relation with the real storage area has been changed, to the access node indicated in the access node list via the network.

8 Claims, 29 Drawing Sheets

FIG. 9

141 METADATA TABLE

| DISK NODE ID | SLICE ID | STATUS | LOGICAL VOLUME ID | SEGMENT ID | COUNTERPART DISK NODE ID | COUNTERPART SLICE ID |
|---|---|---|---|---|---|---|
| DP-A | 1 | P | LVOL-X | 1 | DP-C | 2 |
| DP-A | 2 | P | LVOL-Y | 7 | DP-D | 4 |
| DP-A | 3 | P | LVOL-X | 5 | DP-D | 1 |
| DP-A | 4 | S | LVOL-X | 4 | DP-B | 4 |
| DP-A | 5 | F | | | | |
| DP-A | 6 | P | LVOL-X | 6 | DP-B | 5 |

| DISK NODE ID | SLICE ID | STATUS | LOGICAL VOLUME ID | SEGMENT ID | COUNTERPART DISK NODE ID | COUNTERPART SLICE ID |
|---|---|---|---|---|---|---|
| DP-A | 1 | P | LVOL-X | 1 | DP-C | 2 |
|      | 2 | P | LVOL-Y | 7 | DP-D | 4 |
|      | 3 | P | LVOL-X | 5 | DP-D | 1 |
|      | 4 | S | LVOL-X | 4 | DP-B | 4 |
|      | 5 | F | -      | - | -    | - |
|      | 6 | P | LVOL-X | 6 | DP-B | 6 |
| DP-B | 1 | F | -      | - | -    | - |
|      | 2 | F | -      | - | -    | - |
|      | 3 | S | LVOL-X | 3 | DP-C | 2 |
|      | 4 | P | LVOL-X | 4 | DP-A | 4 |
|      | 5 | S | LVOL-X | 6 | DP-A | 6 |
|      | 6 | F | -      | - | -    | - |
| DP-C | 1 | F | -      | - | -    | - |
|      | 2 | S | LVOL-X | 1 | DP-A | 1 |
|      | 3 | P | LVOL-X | 3 | DP-B | 3 |
|      | 4 | F | -      | - | -    | - |
|      | 5 | F | -      | - | -    | - |
|      | 6 | S | LVOL-X | 2 | DP-D | 6 |
| DP-D | 1 | S | LVOL-X | 5 | DP-A | 3 |
|      | 2 | F | -      | - | -    | - |
|      | 3 | F | -      | - | -    | - |
|      | 4 | S | LVOL-Y | 7 | DP-A | 2 |
|      | 5 | F | -      | - | -    | - |
|      | 6 | P | LVOL-X | 2 | DP-C | 6 |

FIG. 12

| LOGICAL VOLUME ID | SEGMENT ID | PRIMARY SLICE INFORMATION | SECONDARY SLICE INFORMATION |
|---|---|---|---|
| LVOL-X | 1 | DP-A, 1 | DP-C, 2 |
| | 2 | DP-D, 6 | DP-C, 6 |
| | 3 | DP-C, 4 | DP-B, 3 |
| | 4 | DP-B, 4 | DP-A, 4 |
| | 5 | DP-A, 3 | DP-D, 1 |
| | 6 | DP-A, 6 | DP-B, 5 |
| LVOL-Y | 7 | DP-A, 2 | DP-D, 4 |

| LOGICAL VOLUME ID | SEGMENT ID | SLICE INFORMATION |
|---|---|---|
| LVOL-X | 1 | DP-A, 1 |
| | 2 | DP-D, 6 |
| | 3 | DP-C, 4 |
| | 4 | DP-B, 4 |
| | 5 | DP-A, 3 |
| | 6 | DP-A, 6 |
| LVOL-Y | 7 | DP-A, 2 |

| LOGICAL VOLUME ID | SEGMENT ID | PRIMARY SLICE INFORMATION | SECONDARY SLICE INFORMATION |
|---|---|---|---|
| LVOL-X | 1 | – | DP-C, 2 |
| | 2 | DP-D, 6 | DP-C, 6 |
| | 3 | DP-C, 4 | DP-B, 3 |
| | 4 | DP-B, 4 | – |
| | 5 | – | DP-D, 1 |
| | 6 | – | DP-B, 5 |
| LVOL-Y | 7 | – | DP-D, 4 |

FIG. 16

| LOGICAL VOLUME ID | SEGMENT ID |
|---|---|
| LVOL-X | 1 |
| LVOL-X | 4 |
| LVOL-X | 5 |
| LVOL-X | 6 |
| LVOL-Y | 7 |

| ACCESS NODE ID | IP ADDRESS | PORT NUMBER | HEART BEAT RECEPTION DATE AND TIME | LOGICAL VOLUME ID |
|---|---|---|---|---|
| AP#1 | 192.168.0.1 | 20010 | 20090201135448 | LVOL-X |
| AP#2 | 192.168.0.2 | 20009 | 20090201135452 | LVOL-Y |

FIG. 26

| LOGICAL VOLUME ID | SEGMENT ID | PRIMARY UPDATE FLAG |
|---|---|---|
| LVOL-X | 1 | 1 |
| LVOL-X | 4 | 0 |
| LVOL-X | 5 | 1 |
| LVOL-X | 6 | 1 |
| LVOL-Y | 7 | 1 |

525a

LOGICAL VOLUME CONFIGURATION INFORMATION DISTRIBUTION PROGRAM, LOGICAL VOLUME CONFIGURATION INFORMATION DISTRIBUTION METHOD, AND LOGICAL VOLUME CONFIGURATION INFORMATION DISTRIBUTION APPARATUS

CROSS-REFERENCE TO RELATED APPLICATIONS

This application is based upon and claims the benefit of priority of the prior Japanese Patent Application No. 2009-50614, filed on Mar. 4, 2009, the entire contents of which are incorporated herein by reference.

FIELD

The present invention relates to a logical volume configuration information distribution program, a logical volume configuration information distribution method, and a logical volume configuration information distribution apparatus for distributing logical volume configuration information to access nodes.

BACKGROUND

A multi-node storage system is an example of a system for administering data. In such a multi-node storage system, data is distributed and stored in a plurality of computers connected via a network.

In a multi-node storage system, for example, a plurality of disk nodes and access nodes, a control node, and an administration node are connected to each other via a network. Each disk node is a computer having a storage unit. Each disk node administers the storage area of the connected storage unit by dividing the storage area into unit areas of fixed size. Each unit area serving as an administration unit of the disk node is referred to as a slice. Each slice is allocated to a logical volume defined as an access unit from the outside.

Each logical volume is constructed from one or more segments. To each segment, two slices belonging to mutually different disk nodes are allocated. Then, data is duplicated between the two slices allocated to the same segment. An access instruction from a user is issued with respect to a segment in a logical volume.

Each access node is a computer for accessing data in a disk node in response to a data access request from a user. For example, for the purpose of data access to a logical volume, an access node acquires, from the control node the configuration, information of logical volumes. Then, with reference to the configuration information of logical volumes, the access node distributes, to a suitable disk node, the data access from the user to the logical volume. Here, when the access to the disk node has failed, the access node acquires, from the control node, the configuration information that indicates the newest allocation relation of the accessing target segment in the logical volume. Then, on the basis of the newly acquired configuration information, the access node re-tries access to the disk node.

The administration node is a computer operated by a system administrator for administering the multi-node storage system. For example, when an administrator inputs a logical volume generation instruction, a corresponding command is transmitted to the control node.

The control node is a computer for administering allocation or the like of a slice to a logical volume. For example, the control node collects slice information from each disk node. The slice information collected from each disk node depicts the allocation relation between slices administered by the disk node and segments of logical volumes. Then, based on the collected slice information, the control node generates configuration information of logical volumes. Then, in response to a request from an access node, the control node notifies the configuration information of a logical volume to the access node (e.g., Japanese Laid-Open Patent Publication No. 2003-108420 and International Publication No. 2004/104845 pamphlet).

Meanwhile, in the multi-node storage system, the configuration of logical volumes varies depending on various situations. Such an example is fault occurrence in a disk node. Here, it is assumed that a fault has occurred in one disk node during the operation of the multi-node storage system. At that time, the data duplex state breaks down in a segment to which a slice belonging to the fault disk node has been allocated. Thus, a slice is re-allocated to the corresponding segment. This re-allocation is achieved by "copying to a newly allocated slice the data in the accessible slice belonging to the segment whose data duplex state has broken down".

Such processing of restoring the data duplex state by newly allocating a slice to the segment whose data duplex state has broken down and then copying the data is referred to as recovery processing. The start of execution of such recovery processing is administered by the control node. When recovery processing is generated, the configuration information of logical volumes varies to a large extent.

Meanwhile, in the course of recovery processing and immediately after the completion of recovery processing, the configuration information of logical volumes held by the access node deviates temporarily from the actual situation. In this case, after the completion of recovery processing, when an access node actually accesses a disk node, the access fails so that the generating of recovery processing is recognized by the access node. Thus, for example, the access node having failed the access acquires, from the control node, information concerning the slice newly allocated to the accessing target segment and then updates the logical volume configuration information held by the access node itself.

Nevertheless, in a case that in the access node, update processing for the logical volume configuration information is performed after the access error occurrence, a problem arises that response to a data request from a user is delayed temporarily. That is, at the time of access, the access node awaits a response from the disk node until a time-out is detected. After that, the access node acquires, from the control node, the information concerning the newly allocated slice. Then, on the basis of the acquired information, the access is executed again. As a result, the response to the request from the user takes a longer time by the amount of the waiting time for the response, the acquisition time for the logical volume configuration information, and the time of re-accessing.

Such a problem arises not only in recovery processing but also in a case that the correspondence relation is changed between a virtual storage area of a logical volume and a physical storage area of a storage unit.

SUMMARY

According to an aspect of the invention, a recording medium storing a logical volume configuration information distribution program causing a computer to execute processing based on logical volume configuration information that defines a correspondence relation between a virtual storage area in a logical volume defined virtually and a real storage area in a storage unit, the logical volume configuration information is provided via a network to an access node that accesses the real storage area in response to an access request that specifies data in the virtual storage area, wherein the logical volume configuration information distribution program causes a computer to execute: changing the correspondence relation between the virtual storage area of the logical volume and the real storage area in the storage unit in the logical volume configuration information; and when the correspondence relation between the virtual storage area and the real storage area is changed, referencing an access node list storage unit for storing an access node list in which identification information of the access node is registered, and transmitting update information that indicates an updated correspondence relation concerning the virtual storage area whose correspondence relation with the real storage area has been changed, to the access node indicated in the access node list via the network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram depicting an example of a data structure of a slice information storage section.

FIG. 11 is a diagram depicting an example of a data structure of a slice information table.

FIG. 12 is a diagram depicting an example of a data structure of a segment information table.

FIG. 13 is a diagram depicting an example of a data structure of logical volume configuration information.

FIG. 15 is a diagram depicting an example of a segment information table at fault occurrence.

FIG. 16 is a diagram depicting an example of a data structure of a restoration target list.

FIG. 25 is a diagram depicting an example of a data structure of an access node list according to a second embodiment.

FIG. 26 is a diagram depicting an example of a restoration target list according to a second embodiment.

DESCRIPTION OF EMBODIMENTS

Embodiments of the present invention are described below with reference to the drawings.

Figure 1:
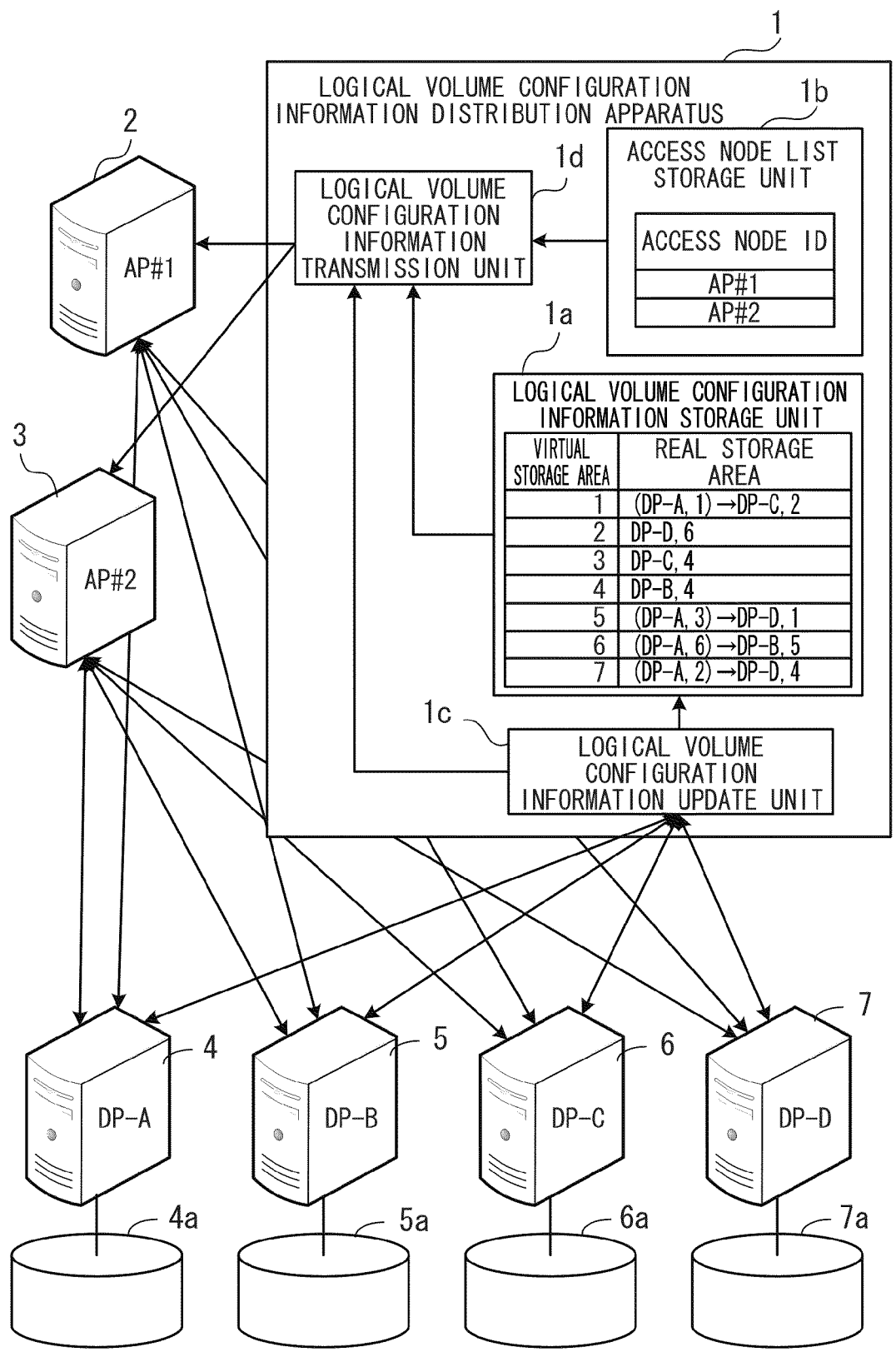
FIG. 1 is a diagram depicting an outline of an embodiment.

FIG. 1 is a diagram depicting an outline of an embodiment. A logical volume configuration information distribution apparatus 1 is connected to access nodes 2 and 3 and disk nodes 4 to 7 via a network. The logical volume configuration information distribution apparatus 1 distributes logical volume configuration information to the access nodes 2 and 3 via the network. Here, the logical volume configuration information defines the correspondence relation between virtual storage areas in logical volumes defined virtually and real storage areas in the storage units 4a, 5a, 6a, and 7a.

The access nodes 2 and 3 are computers each for accessing a real storage area based on the logical volume configuration information in response to an access request that specifies data in a virtual storage area. The disk nodes 4 to 7 include the storage units 4a, 5a, 6a, and 7a, respectively.

The logical volume configuration information distribution apparatus 1 includes a logical volume configuration information storage unit 1a, an access node list storage unit 1b, a logical volume configuration information update unit 1c, and a logical volume configuration information transmission unit 1d.

The logical volume configuration information storage unit 1a stores logical volume configuration information that indicates the correspondence relation between virtual storage areas of logical volumes and real storage areas in the storage units 4a, 5a, 6a, and 7a. The access node list storage unit 1b stores the identification information (access node IDs) of the access nodes 2 and 3.

The logical volume configuration information update unit 1c changes the correspondence relation between virtual storage areas of logical volumes and real storage areas in storage units in the logical volume configuration information. For example, when a fault occurs in any one of the disk nodes 4 to 7, the logical volume configuration information update unit 1c newly assigns real storage areas in a currently operating disk node to the virtual storage areas that had been assigned to the real storage areas in the faulty disk node. The updated correspondence relation is, for example, reflected in the logical volume configuration information storage unit 1a.

When the correspondence relation between virtual storage areas and real storage areas is changed, by referencing the access node list storage unit 1b, the logical volume configuration information transmission unit 1d acquires the identification information of the access nodes 2 and 3. Then, the logical volume configuration information transmission unit 1d transmits update information that indicates the changed correspondence relation concerning the virtual storage area whose correspondence relation with the real storage area has been changed, to the access nodes 2 and 3 indicated by the acquired identification information, via the network. The changed correspondence relation may be acquired, for example, by referring to the logical volume configuration information storage unit 1a.

It is assumed that in the course of operation of this multi node system, an event like a fault in a disk node arises that requires a change in the logical volume configuration information. In this case, the logical volume configuration information update unit 1c changes the correspondence relation between virtual storage areas of logical volumes and real storage areas in storage units in the logical volume configuration information. When the correspondence relation between virtual storage areas and real storage areas is changed, the logical volume configuration information transmission unit 1d refers to the access node list storage unit 1b. Then, the logical volume configuration information transmission unit 1d acquires the identification information of the access nodes 2 and 3. Then, the logical volume configuration information transmission unit 1d transmits update information that indicates the changed correspondence relation concerning the virtual storage area whose correspondence relation with the real storage area has been changed, to the access nodes 2 and 3 indicated by the acquired identification information, via the network.

As such, since the access node list is provided in advance in the logical volume configuration information distribution apparatus 1, when the correspondence relation between virtual storage areas and real storage areas is changed, update information may be transmitted without awaiting error occurrence in the access nodes 2 and 3. By virtue of this, in the access nodes 2 and 3, when a real storage area corresponding to a virtual storage area specified in an access request from a user is to be accessed, the access destination real storage area may be determined based on the newest logical volume configuration information. Accordingly, even when a virtual storage area whose corresponding real storage area has been changed is to be accessed at the first time after the correspondence relation change, the access nodes 2 and 3 may access the data without suffering an access error. This permits rapid response to a user having inputted the access request.

Further, for example, when a fault occurs in a disk node, a large number of changes become necessary in the correspondence relation between virtual storage areas and real storage areas. In such a case, in the related art, access nodes suffer access failures and then, at each time, each access node makes a request for a real storage area corresponding to the virtual storage area of accessing target, to the logical volume configuration information distribution apparatus. This causes a large amount of communication between the nodes until the configuration information concerning all segments held in all access nodes has been updated to the newest state. This increase in the amount of communication through the network reduces the overall processing efficiency of the system.

In contrast, the logical volume configuration information distribution apparatus 1 depicted in FIG. 1 may transmit, to the access nodes 2 and 3, the update information that indicates the entirety of the changed correspondence relation. Thus, even when a large number of changes occur simultaneously in the correspondence relation between virtual storage areas and real storage areas, a single information transmission to each of the access nodes 2 and 3 is sufficient. This minimizes reduction in the overall processing efficiency of the system that could otherwise be caused by the communication of notifying the contents of changes in the logical volume configuration information to the access nodes 2 and 3.

Meanwhile, the contents of the access node list may be updated in response to an operation input from a system administrator. Further, whether the access nodes 2 and 3 are operating or not may be monitored with the logical volume configuration information distribution apparatus 1, and then the contents of the access node list may be updated automatically. Such automatic update avoids mistakes in transmission of logical volume configuration information concerning access nodes newly added to the system.

Further, a plurality of real storage areas may be allocated to a virtual storage area of a logical volume so that duplex processing may be implemented by using the real storage areas. In this case, the real storage areas allocated to a common virtual storage area may be divided into a primary real storage area and a secondary real storage area. The primary real storage area is a real storage area serving as an accessing target from the access nodes 2 and 3. The secondary real storage area is a real storage area for storing a copy of data stored in the primary real storage area. In the case of a logical volume having this configuration, it is sufficient that among the correspondence relation between virtual storage areas and real storage areas, only the correspondence relation concerning the primary real storage area is notified to the access nodes 2 and 3.

Thus, embodiments of the present invention are described below in detail for an exemplary case that an access node list is updated automatically in a multi-node storage system in which data stored in a logical volume is duplicated and stored in storage units.

First Embodiment

Figure 2:
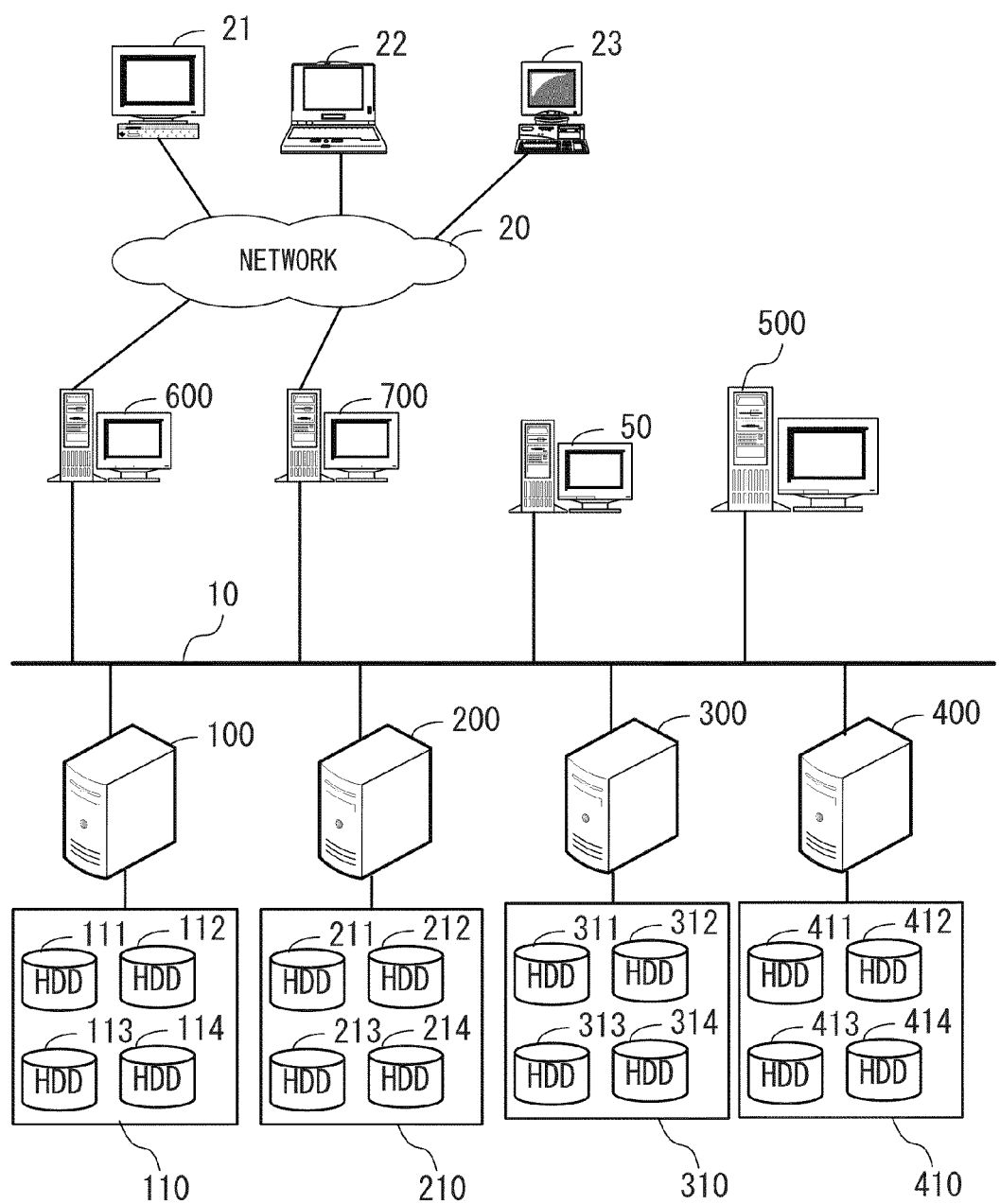
FIG. 2 is a diagram depicting an exemplary configuration of a multi-node storage system according to an embodiment.

FIG. 2 is a diagram depicting an exemplary configuration of a multi-node storage system according to an embodiment. In the present embodiment, a plurality of disk nodes 100, 200, 300, and 400, a control node 500, access nodes 600 and 700, and an administration node 50 are connected to each other via a network 10. The disk nodes 100, 200, 300, and 400 are connected to storage units 110, 210, 310, and 410, respectively.

The storage unit 110 is provided with a plurality of hard disk drives (HDDs) 111, 112, 113, and 114. The storage unit 210 is provided with a plurality of HDDs 211, 212, 213, and 214. The storage unit 310 is provided with a plurality of HDDs 311, 312, 313, and 314. The storage unit 410 is provided with a plurality of HDDs 411, 412, 413, and 414. Each of the storage units 110, 210, 310, and 410 is a RAID system employing built-in HDDs. For example, each of the storage units 110, 210, 310, and 410 may provide a disk administration service of RAID 5.

Each of the disk nodes 100, 200, 300, and 400 is a computer, for example, having an architecture referred to as IA (Intel Architecture). The disk nodes 100, 200, 300, and 400 administer the data stored in the connected storage units 110, 210, 310, and 410, respectively, and distribute the administered data to terminal units 21, 22, and 23 via the network 10.

Further, the disk nodes 100, 200, 300, and 400 administer data with redundancy. That is, the same data is administered in at least two disk nodes.

The control node 500 administers the disk nodes 100, 200, 300, and 400 and the access nodes 600 and 700. For example, when an addition request for a new storage unit is received from the administration node 50, the control node 500 defines a new logical volume so as to prepare the configuration so that data stored in the added storage unit may be accessed through the new logical volume. Further, when desired, the control node 500 transmits the contents of the definition of the logical volume to the access nodes 600 and 700.

To the access nodes 600 and 700, a plurality of terminal units 21, 22, and 23 are connected via a network 20. In the access nodes 600 and 700, logical volumes are defined. In response to access requests for data on logical volumes issued from the terminal units 21, 22, and 23, the access nodes 600 and 700 access the corresponding data in the disk nodes 100, 200, 300, and 400.

The administration node 50 is a computer used by an administrator for administering the operation of the multi-node storage system. For example, the administration node 50 acquires information such as the amount of usage of logical volumes in the multi-node storage system, and then displays the operation situation onto a screen.

Figure 3:
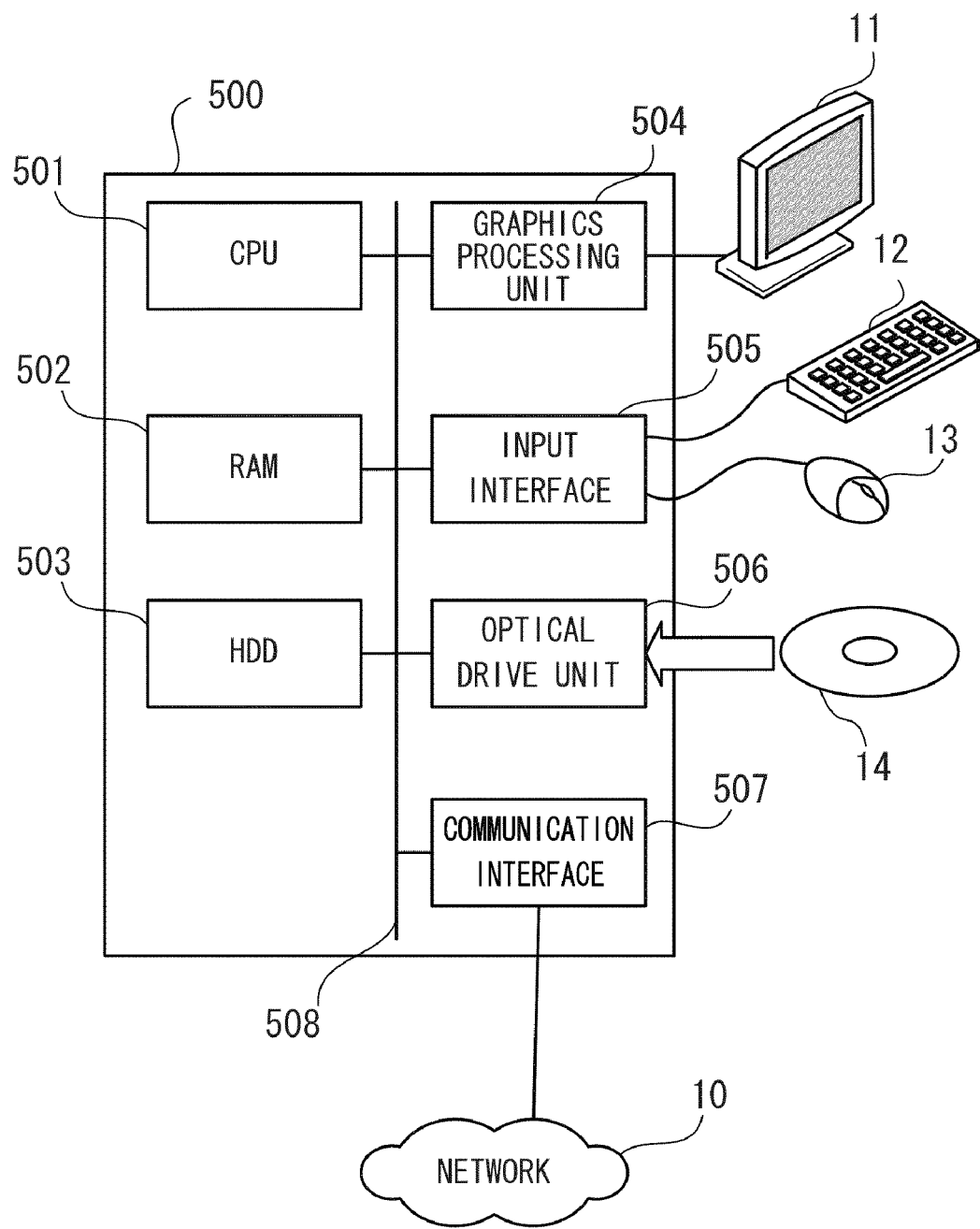
FIG. 3 is a diagram depicting an exemplary hardware construction of a control node employed in an embodiment.

FIG. 3 is a diagram depicting an exemplary hardware construction of the control node employed in the present embodiment. In the control node 500, the apparatus is controlled by a CPU (Central Processing Unit) 501. The CPU 501 is connected to a RAM (Random Access Memory) 502 and a plurality of peripheral devices via a bus 508.

The RAM 502 serves as a main storage unit of the control node 500. The RAM 502 temporarily stores at least a part of OS (Operating System) programs and application programs executed by the CPU 501. Further, the RAM 502 stores various kinds of data used in the processing by the CPU 501.

Peripheral devices connected via the bus 508 include a hard disk drive (HDD) 503, a graphics processing unit 504, an input interface 505, an optical drive unit 506, and a communication interface 507.

The HDD 503 magnetically writes and reads data into and from a built-in disk. The HDD 503 serves as a secondary storage unit of the control node 500. The HDD 503 stores OS programs, application programs, and various kinds of data. Here, the secondary storage unit may be implemented by a semiconductor memory device such as a flash memory.

A monitor 11 is connected to the graphics processing unit 504. In response to a command from the CPU 501, the graphics processing unit 504 displays an image on the screen of the monitor 11. The monitor 11 may be implemented by a CRT (Cathode Ray Tube) display unit, a liquid crystal display unit, or the like.

A keyboard 12 and a mouse 13 are connected to the input interface 505. The input interface 505 transmits to the CPU 501a signal inputted through the keyboard 12 and/or the mouse 13. Here, the mouse 13 is an example of a pointing device, and hence may be replaced by another pointing device. Such pointing devices include a touch panel, a tablet, a touchpad, a trackball or the like.

The optical drive unit 506 reads data recorded on an optical disk 14, by using laser light or the like. The optical disk 14 is a portable recording medium on which data is recorded to be readable by the reflection of light. Types of the optical disk 14 include DVD (Digital Versatile Disc), DVD-RAM, CD-ROM (Compact Disc Read Only Memory), CD-R (Recordable)/RW (ReWritable) or the like.

The communication interface 507 is connected to the network 10. The communication interface 507 transmits and receives data to and from the disk nodes 100, 200, 300, and 400, the access nodes 600 and 700, and the administration node 50 via the network 10.

The above-mentioned hardware construction implements the processing functions according to the present embodiment. Here, FIG. 3 depicts the hardware construction of the control node 500. However, the disk nodes 100, 200, 300, and 400, the access nodes 600 and 700, and the administration node 50 may also be implemented by a similar hardware construction.

Figure 4:
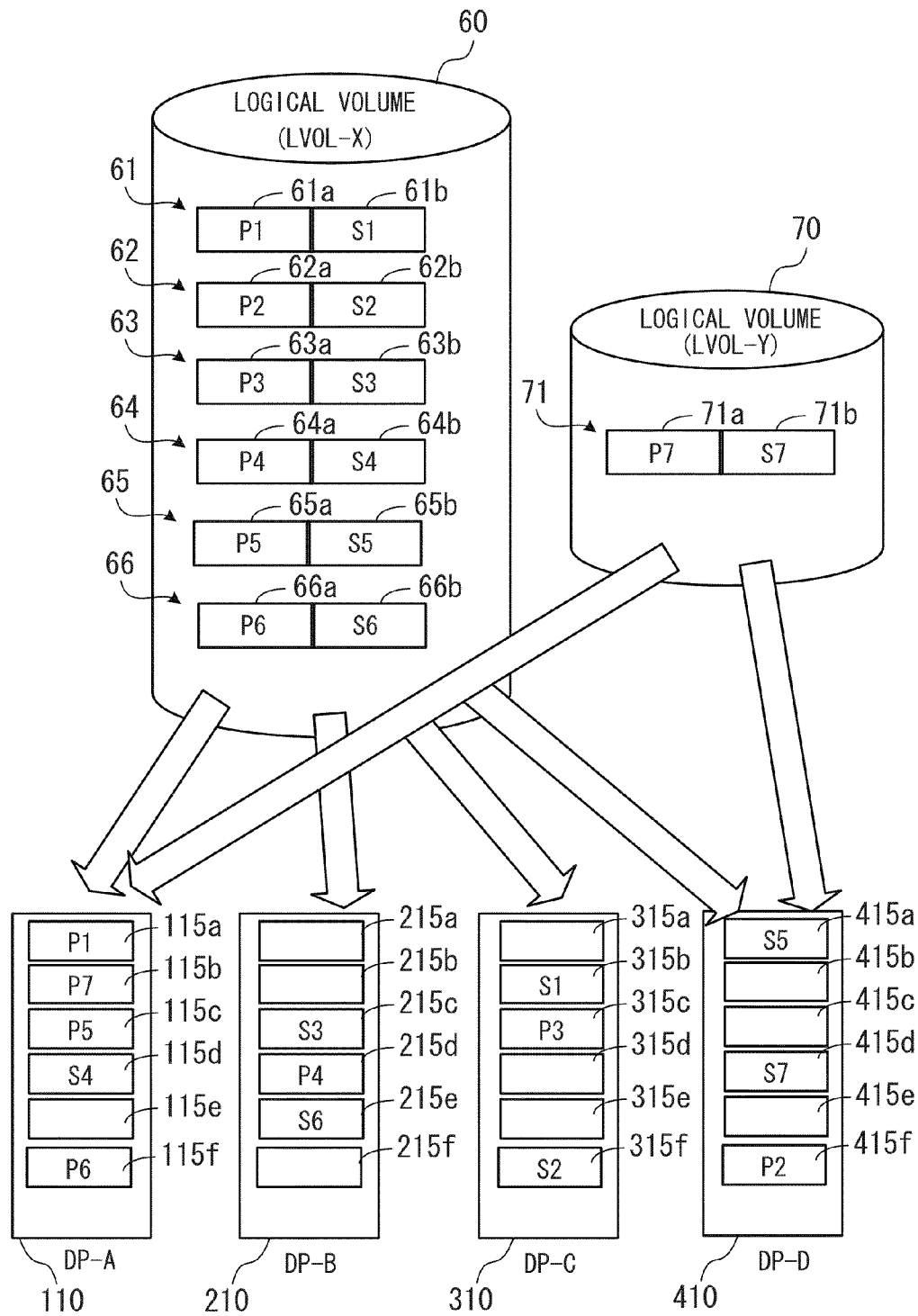
FIG. 4 is a diagram depicting a data structure of logical volumes.

FIG. 4 is a diagram depicting a data structure of logical volumes. In the present embodiment, a logical volume 60 has a logical volume identifier "LVOL-X", while a logical volume 70 has a logical volume identifier "LVOL-Y". The four disk nodes 100, 200, 300, and 400 connected via the network have node identifiers "DP-A", "DP-B", "DP-C", and "DP-D", respectively, for the purpose of identification of each node. The storage units 110, 210, 310, and 410 connected to the disk nodes 100, 200, 300, and 400, respectively, are uniquely identified on the network 10 by the node identifiers of the disk nodes 100, 200, 300, and 400.

Each of the storage units 110, 210, 310, and 410 provided in the disk nodes 100, 200, 300, and 400 makes up a storage system, for example, of RAID 5. The storage function provided by the storage units 110, 210, 310, and 410 is divided into a plurality of slices 115a to 115f, 215a to 215f, 315a to 315f, and 415a to 415f and administered. The slices 115a to 115f, 215a to 215f, 315a to 315f, and 415a to 415f correspond to the real storage areas depicted in FIG. 1.

The logical volume 60 includes segments 61 to 66. The logical volume 70 includes a segment 71. The segments 61 to 66 and 71 correspond to the virtual storage areas depicted in FIG. 1. The storage capacity of each of the segments 61 to 66 and 71 is substantially equal to the storage capacity of a slice serving as an administration unit in the storage units 110, 210, 310, and 410. For example, when the storage capacity of a slice is 1 gigabyte, the storage capacity of a segment is also 1 gigabyte. The storage capacity of each of the logical volumes 60 and 70 is substantially equal to an integral multiple of the storage capacity per segment. Each of the segments 61 to 66 is respectively made up of a pair (slice pair) of primary slices 61a, 62a, 63a, 64a, 65a, and 66a, and secondary slices 61b, 62b, 63b, 64b, 65b, and 66b. The segment 71 is made up of a pair of a primary slice 71a and a secondary slice 71b.

The two slices allocated to the same segment are assigned to mutually different disk nodes. A region used for administering each slice has a flag in addition to a logical volume identifier, segment information, and slice information of the slices making up the same segment. The flag stores a value indicating primary or secondary.

In the example of FIG. 4, the identifier of each slice in the logical volumes 60 and 70 is made up of a combination of a letter of "P" or "S" and numeric characters. "P" indicates a primary slice, while "S" indicates a secondary slice. The numeric characters following the letter indicate the segment number to which the slice belongs. For example, the primary slice of a first segment 61 is indicated by "P1", while the secondary slice is indicated by "S1".

Here, in FIG. 4, the logical volume 60 includes a first segment to a sixth segment. Further, the logical volume 70 has a seventh segment. In this numbering, the segment numbers of the two logical volumes 60 and 70 are not duplicated with each other. This has been adopted for simplicity of distinguishing the segments of the logical volumes 60 and 70. In practice, information for identifying each segment includes the identification information (logical volume identifier) of a logical volume to which the segment belongs. Thus, duplication in segment numbers is permitted between logical volumes. That is, in the logical volume 70, segments may also start at segment number 1.

The allocation relation of slices to the segments 61 to 66 included in the logical volume 60 is administered by the control node 500 based on a segment information table. The logical volume 70 is similarly administered by the control node 500. When a slice allocated to a segment is changed, the segment information table in the control node 500 is updated. At that time, the logical volume configuration information that indicates the allocation relation of the primary slice to the segment is also updated. The access nodes 600 and 700 request the logical volume configuration information from the control node 500 so as to acquire the information.

Figure 5:
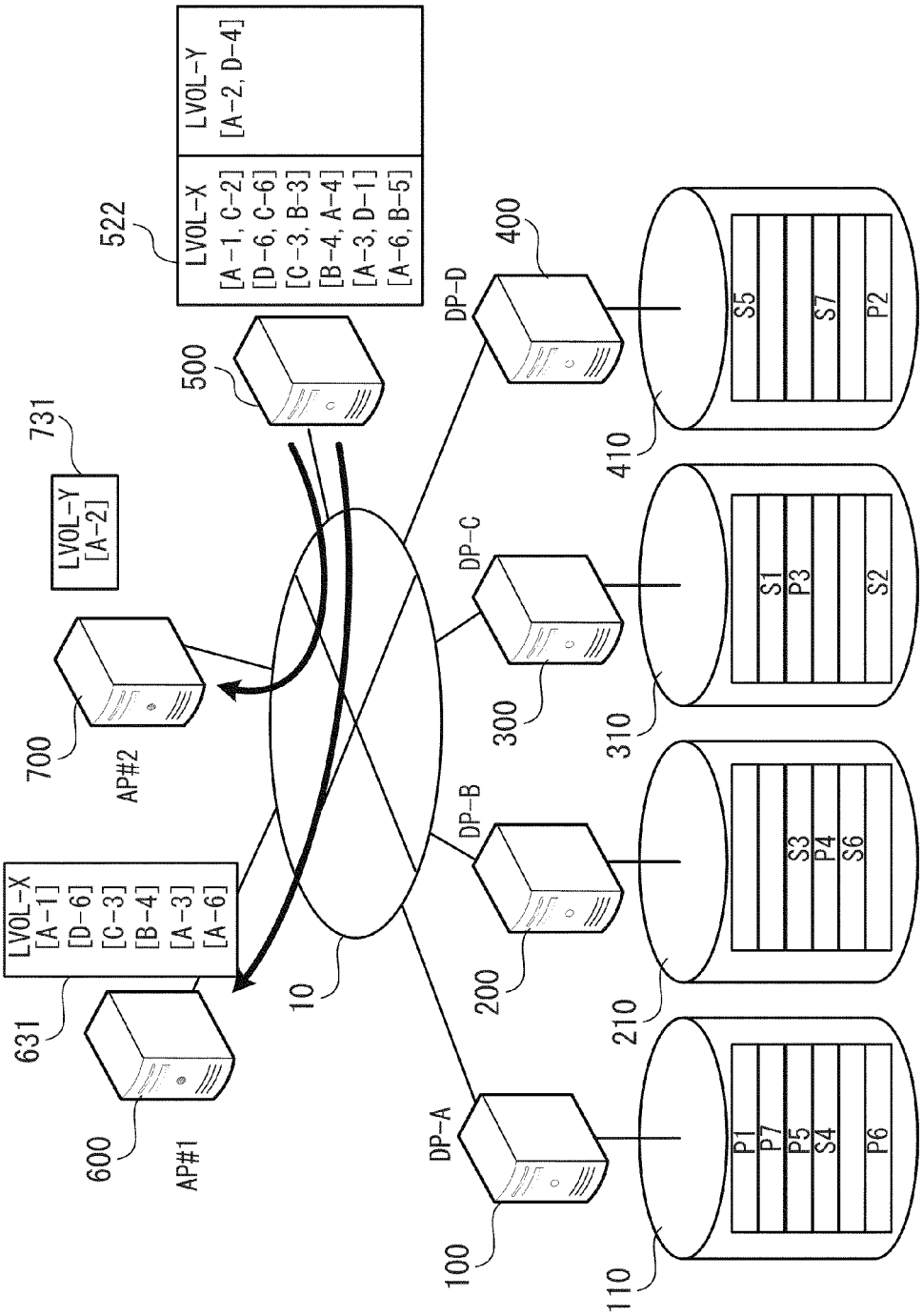
FIG. 5 is a diagram depicting a situation of acquisition of logical volume configuration information at a start of operation of access nodes.

FIG. 5 is a diagram depicting a situation of acquisition of logical volume configuration information at a start of operation of access nodes. The control node 500 has a segment information table 522. The segment information table 522 held in the control node 500 includes information concerning primary slices and secondary slices allocated to the individual segments 61 to 66 and 71 of the logical volumes 60 and 70. In FIG. 5, the left-hand part of the segment information table 522 depicts information concerning the logical volume 60, while the right-hand part depicts information concerning the logical volume 70.

Here, the access node 600 has an access node ID "AP#1" used for unique identification within the multi-node storage system. Further, the access node 700 has an access node ID "AP#2". The access node 600 handles the logical volume 60, while the access node 700 handles the logical volume 70.

In the example of FIG. 5, the contents of the segment information table 522 are simplified. The information within each pair of brackets in the segment information table 522 indicates the allocation of slices to one segment belonging to the logical volume. The left-hand part within brackets indicates information concerning the primary slice, while the right-hand part indicates information concerning the secondary slice. The information concerning each slice is made up of a combination of the node identifier of the disk node (in FIG. 5, "DP-" is omitted so that the last symbol alone is depicted) and the slice ID in the disk node.

When the operation of the multi-node storage system is started, the access nodes 600 and 700 request the logical volume configuration information from the control node 500. In the example of FIG. 5, the access node 600 performs access processing of the logical volume 60 having the logical volume identifier "LVOL-X". Further, the access node 700 performs access processing of the logical volume 70 having the logical volume identifier "LVOL-Y". In this case, the access node 600 makes a request to the control node 500 for the logical volume configuration information concerning the logical volume 60. Similarly, the access node 700 makes a request to the control node 500 for the logical volume configuration information concerning the logical volume 70.

The control node 500 transmits, to the access nodes 600 and 700, the logical volume configuration information including information concerning the primary slices among the requested logical volume information in the segment information table 522. As a result, the access nodes 600 and 700 obtain logical volume configuration information 631 and 731, respectively.

As depicted in FIG. 5, the logical volume configuration information 631 and 731 held by the access nodes 600 and 700 include information concerning the primary slices, and do not include information concerning the secondary slices. This is because access from the access nodes 600 and 700 to the disk nodes 100, 200, 300, and 400 is performed only for the primary slices. As such, since the logical volume configuration information 631 and 731 distributed to the access nodes 600 and 700 do not include information concerning the secondary slices, the amount of data transferred from the control node 500 to the access nodes 600 and 700 is reduced.

Here, when data is written from the access nodes 600 and 700 into a primary slice, the disk node administering the primary slice copies the data to the secondary slice (mirroring). This maintains the data duplex state without having the access nodes 600 and 700 recognize the location of the secondary slice.

Here, it is assumed that a fault occurs in the disk node 100. Then, in the segments to which slices administered by the disk node 100 have been allocated, the data duplex state breaks down. Hereinafter, a segment whose data duplex state has broken down is referred to as a "degenerated segment". When a degenerated segment occurs, the control node 500 starts recovery processing.

Figure 6:
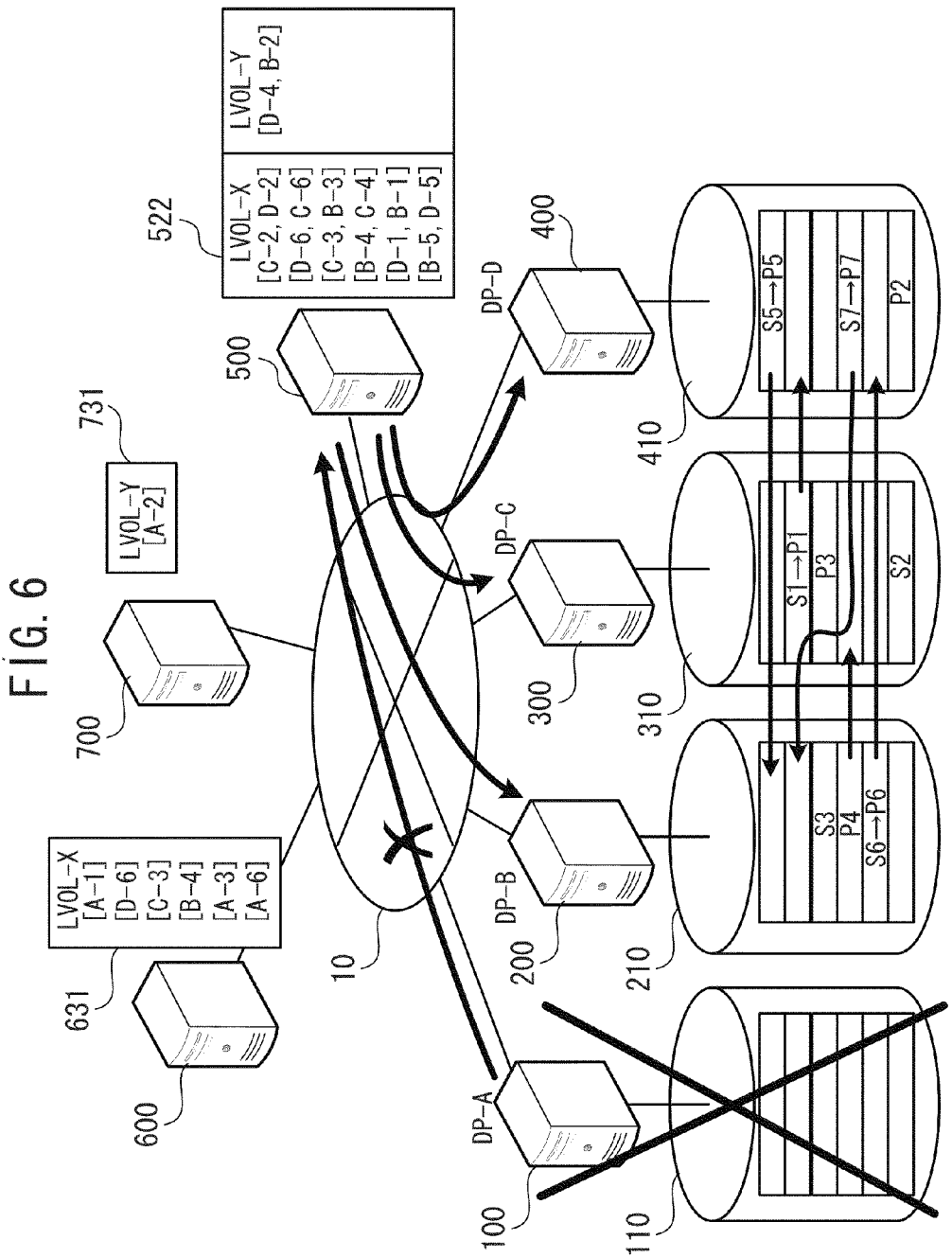
FIG. 6 is a diagram depicting a situation of recovery processing in a control node.

FIG. 6 is a diagram depicting a situation of recovery processing in the control node. First, the control node 500 detects a fault in the disk node 100. For example, when a heart beat (a signal for notifying normal operation) to be outputted periodically from the disk node 100 has stopped for a specific time, the control node 500 recognizes the occurrence of a fault in the disk node 100. Here, when the location of fault occurrence is the storage unit 110, the disk node 100 may detect the fault and then notify the situation to the control node 500.

When detecting that access to the storage unit 110 becomes unavailable, the control node 500 starts recovery processing. In the recovery processing, counterpart slices allocated to the same segments as the slices administered by the disk node 100 are changed into primary slices. In the example of FIG. 6, the fifth slice in the disk node 200, the second slice in the disk node 300, the first slice in the disk node 400, and the fourth slice in the disk node 400 are changed from secondary slices to primary slices.

The control node 500 allocates a secondary slice to each degenerated segment. Specifically, free slices (slices not yet allocated to any segments) are extracted from the slices administered by the disk nodes 200, 300, and 400 under normal operation, and then allocated to degenerated segments. At that time, as for a disk node to which a slice already allocated to a degenerated segment belongs, the control node 500 allocates, to the degenerated segment, a slice belonging to another disk node. That is, the control node 500 performs the slice allocation always so that two slices making up a slice pair after allocation belong to mutually different disk nodes.

When a new slice is allocated to a degenerated segment, the control node 500 updates the segment information table 522 based on the allocation result. Then, the control node 500 notifies the allocation result to the disk nodes 200, 300, and 400.

Based on the notification from the control node 500, the disk nodes 200, 300, and 400 recognize segments serving as destinations of allocation of slices administered by the disk nodes themselves and slices belonging to other disk nodes which serve as counterparts of the slice pairs. A disk node administering the primary slice of each degenerated segment copies the data in the primary slice to the secondary slice allocated to the degenerated segment. Here, even during the data copying, access from the access nodes 600 and 700 to the primary slice is permitted.

When the copying of data in the slice is completed, the processing of restoration of the data duplex state of the degenerated segment is completed and hence the corresponding segment is no longer degenerated. Nevertheless, in this state, the logical volume configuration information 631 and 731 in the access nodes 600 and 700 are not yet updated. Thus, the control node 500 performs transmission of the updated logical volume configuration information to the access nodes 600 and 700. Here, the transmission of logical volume configuration information is executed without awaiting the completion of the copying of data in the degenerated segment.

Figure 7:
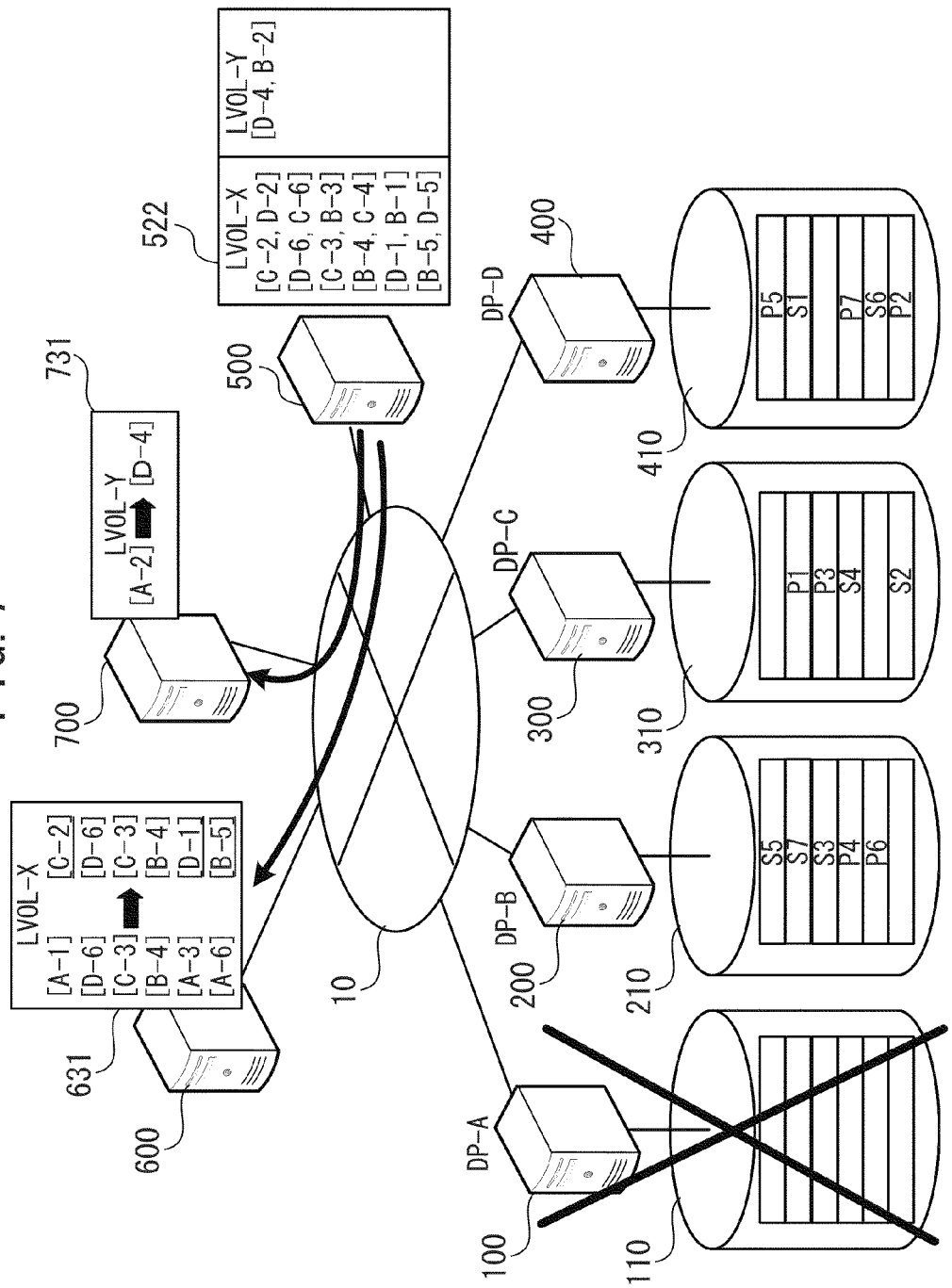
FIG. 7 is a diagram depicting a situation of notification of logical volume configuration information to access nodes.

FIG. 7 is a diagram depicting a situation of notification of the logical volume configuration information to access nodes. In order that the control node 500 achieve notification of the updated logical volume configuration information to the access nodes 600 and 700, the control node 500 preferably recognizes in advance the presence of the access nodes 600 and 700. Thus, the identification information of the access nodes 600 and 700 included in the multi-node storage system is registered in advance into the control node 500.

In response to the start of recovery processing, the control node 500 notifies the access nodes 600 and 700 that the logical volume configuration information has been updated in the segment information table 522. The access nodes 600 and 700 having received the notification refer to the updated segment information table 522 held by the control node 500. The access nodes 600 and 700 acquire, from the segment information table 522, the information concerning the primary slices, and update the logical volume configuration information 631 and 731.

As such, before the disk node 100 having a fault is accessed from the access nodes 600 and 700, the logical volume configuration information 631 and 731 of the access nodes 600 and 700 are updated. Thus, even if the access from the access nodes 600 and 700 to the data in a segment having had suffered a degenerated state caused by a fault in the disk node 100 is the first occasion after the recovery processing, the access is achieved appropriately based on the updated logical volume configuration information 631 and 731. This reduces the possibility that the occurrence of recovery processing causes a delay in responding to users.

Next, the functions of individual units for implementing the recovery processing according to the present embodiment are described below in detail.

Figure 8:
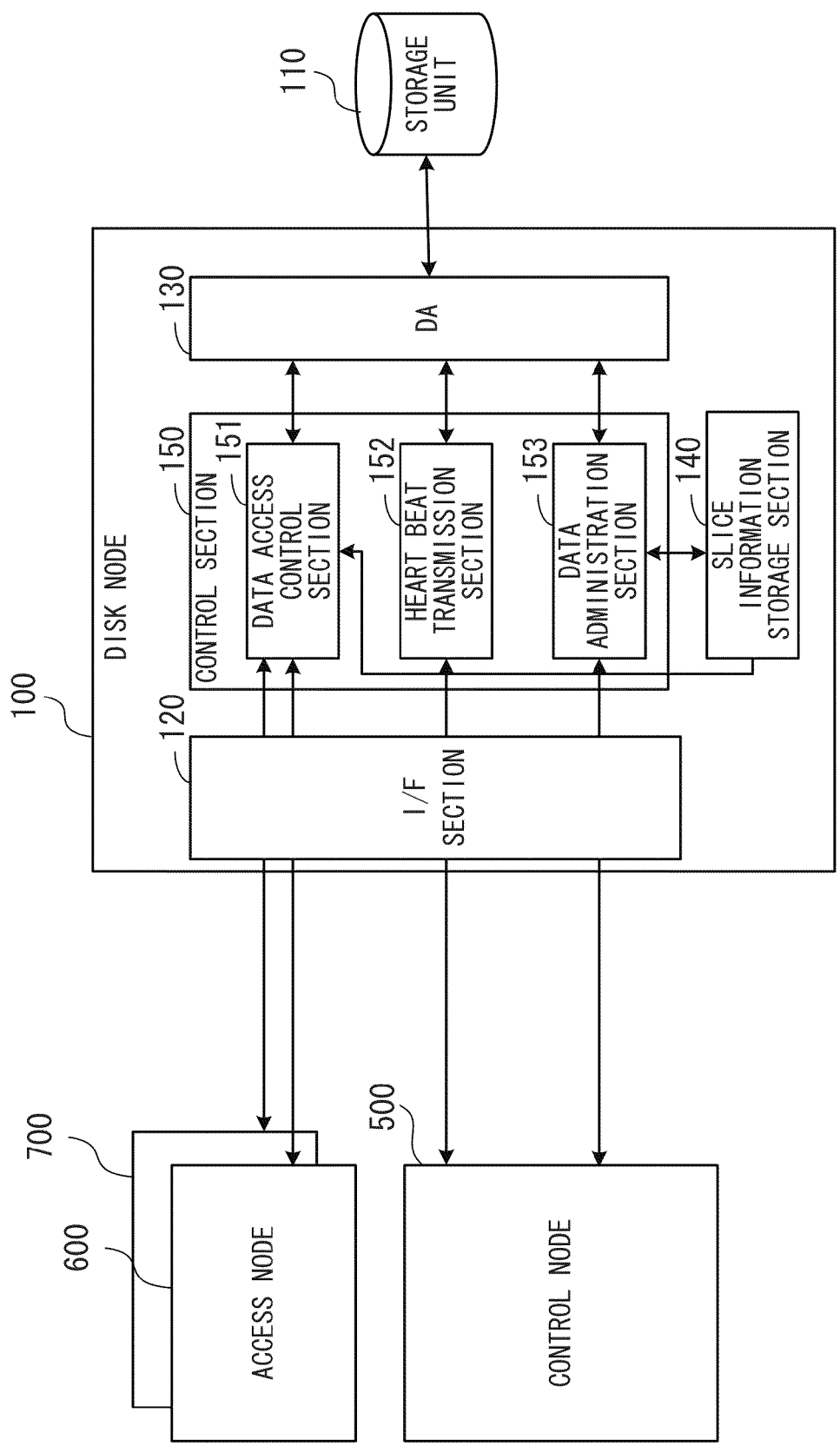
FIG. 8 is a block diagram depicting a function of a disk node.

FIG. 8 is a block diagram depicting the function of a disk node. The disk node 100 has an interface (I/F) section 120, a device control section 130, a slice information storage section 140, and a control section 150.

The I/F section 120 implements a communication function of performing data communication with other devices via the network 10 based on a specific communication protocol. The device control section 130 controls the storage unit 110.

The slice information storage section 140 implements a storage function of storing the slice information used for administering the slices in the storage unit 110. For example, a part of the storage area in the RAM of the disk node 100 is used as the slice information storage section 140. Here, the slice information is generated by collecting metadata provided in individual slices. The metadata is information that indicates a segment to which a corresponding slice is allocated and the counterpart slice of the slice pair.

The control section 150 includes a data access control section 151, a heart beat transmission section 152, and a data administration section 153.

When receiving an I/O request (a read request or a write request) from an access node, the data access control section 151 determines a slice serving as the accessing target by referencing the slice information storage section 140. The data access control section 151 accesses the data in the storage unit 110 in accordance with the access request. For example, when the I/O request is a read request, the data access control section 151 acquires data from the storage unit 110, and then transmits the data to the access node 30. Further, when the I/O request is a write request, the data access control section 151 writes the data into the storage unit 110.

The heart beat transmission section 152 periodically notifies the control node 500 that the disk node 100 and the storage unit 110 are operating normally. Specifically, when the disk node 100 and the storage unit 110 are operating normally, the heart beat transmission section 152 periodically transmits, to the control node 500, a normal operation notification (a heart beat) that indicates a normal operation state. When the heart beat from the disk node 100 has stopped for a specific time, the control node 500 recognizes that a fault has occurred in the disk node 100.

When receiving an update instruction for the slice information from the control node 500, the data administration section 153 updates the slice information stored in the slice information storage section 140. An example of the update processing for slice information is conversion of a slice into a primary slice. When receiving a conversion-into-primary instruction, the data administration section 153 updates the attribute of the metadata indicated by the slice ID included in the conversion-into-primary instruction in the slice information storage section 140, into "primary (P)".

Further, when receiving a slice allocation instruction, the data administration section 153 identifies metadata from the slice information storage section 140 by adopting the slice ID included in the slice allocation instruction as a key. The data administration section 153 updates the contents of the identified metadata in accordance with the contents specified in the slice allocation instruction (that includes information concerning a segment of allocation destination and a counterpart slice that makes up a pair). When a slice in the storage unit 110 is newly allocated to a segment, the data administration section 153 acquires data from the slice making up a pair and administered by another disk node, and stores the data into the newly allocated slice.

Here, after updating the metadata in the slice information, the data administration section 153 also updates the corresponding metadata in the storage unit 110. This maintains the identity between the metadata in the storage unit 110 and the metadata in the slice information storage section 140. At startup of the disk node 100, metadata is read from the storage unit 110 and then slice information is generated by the data administration section 153. When receiving a slice information acquisition request from the control node 500, the data administration section 153 transmits, to the control node 500, the slice information in the slice information storage section 140.

Further, the data administration section 153 performs the processing of data redundancy guarantee between primary slices and secondary slices. Specifically, when a data write has been performed by the data access control section 151 in response to a write request, the data administration section 153 determines a disk node that administers a secondary slice corresponding to the primary slice into which data has been written. Then, in cooperation with the data administration section of the corresponding disk node, the data administration section 153 updates the data in the secondary slice similarly to the update in the primary slice.

In the recovery processing, when the slice in the storage unit 110 is the primary slice of a degenerated segment, the data administration section 153 transmits the data in the slice to the disk node that administers the secondary slice, thereby recovering the duplex state of the data of the degenerated segment.

Here, FIG. 8 depicts the function of the disk node 100. However, the disk nodes 200, 300, and 400 also have a function similar to that of the disk node 100.

Next, the data stored in the slice information storage section 140 is described below in detail.

FIG. 9 is a diagram depicting an example of the data structure of the slice information storage section. The slice information storage section 140 stores a metadata table 141. The metadata table 141 includes the fields of disk node ID, slice ID, status, logical volume ID, segment ID, counterpart disk node ID, and counterpart slice ID. Information located in the horizontal direction in the metadata table 141 is associated with each other and make up one record that represents metadata.

In the disk node ID field, the identification information (disk node ID) of the disk node 100 that administers the storage unit 110 is set.

In the slice ID field, the identification information (slice ID) of a slice corresponding to the metadata within the storage unit 110 is set.

In the status field, a status flag that indicates the status of the slice is set. When the slice is not yet allocated to a segment of a logical volume, a status flag "F" is set. When the slice has been allocated to a primary storage of a segment of a logical volume, a status flag "P" is set. When the slice has been allocated to a secondary storage of a segment of a logical volume, a status flag "S" is set.

In the logical volume ID field, identification information (a logical volume ID) is set for identifying a logical volume to which the segment corresponding to the slice belongs.

In the segment ID field, identification information (a segment ID) for a segment included in a logical volume is set.

In the counterpart disk node ID field, the identification information (disk node ID) of a disk node that administers a storage unit having the counterpart slice (a counterpart slice belonging to the same segment) is set.

In the counterpart slice ID field, identification information (a slice ID) is set for identifying the counterpart slice within a storage unit to which the slice belongs.

Figure 10:
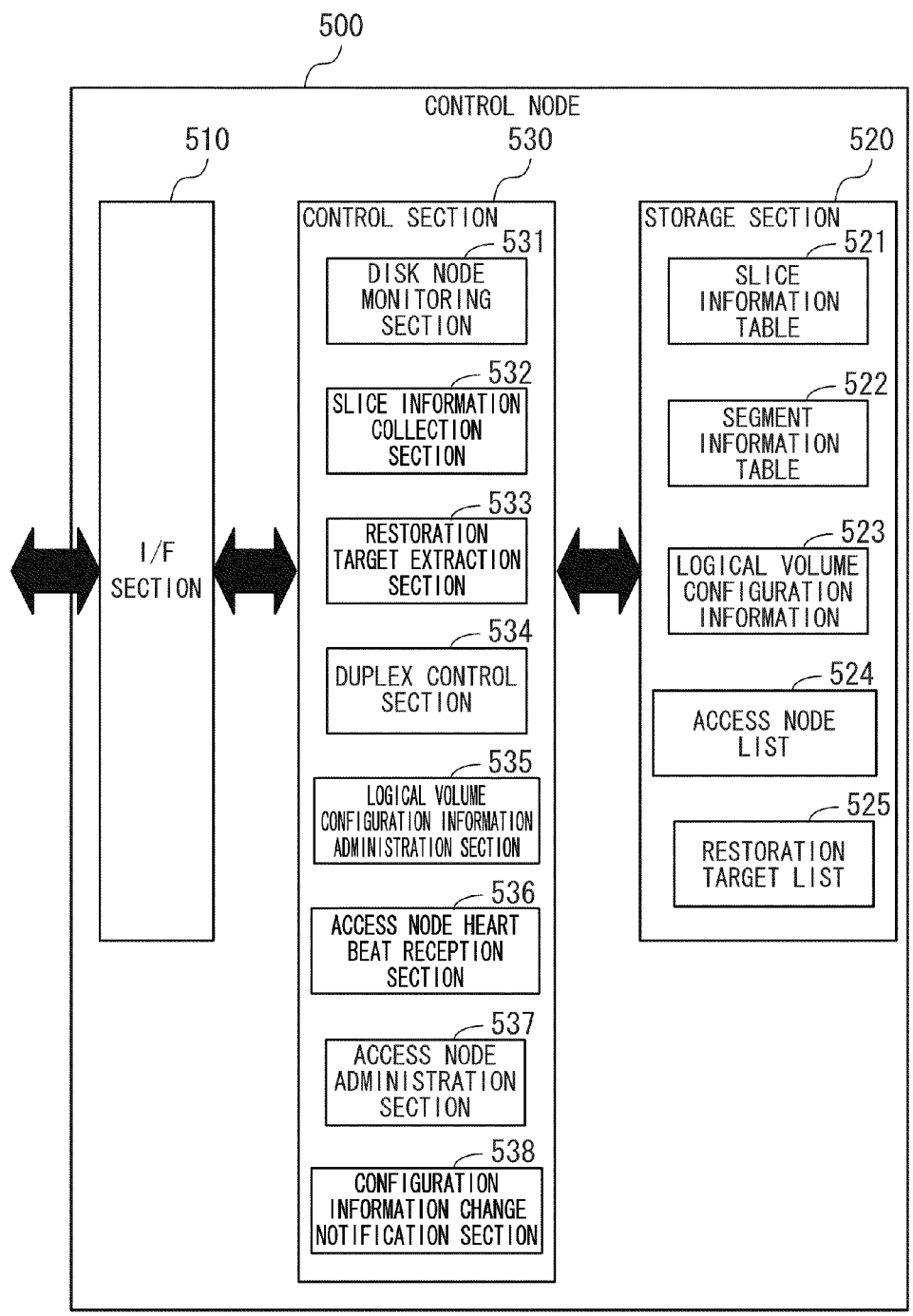
FIG. 10 is a block diagram depicting a function of a control node.

FIG. 10 is a block diagram depicting the function of the control node. The control node 500 has an interface (I/F) section 510, a storage section 520, and a control section 530. The I/F section 510 implements a communication function of performing data communication with the disk nodes 100, 200, 300, and 400, the access nodes 600 and 700, and the administration node 50 via the network 10 based on a specific communication protocol.

The storage section 520 implements a storage function of storing various kinds of information. For example, a part of the storage area of the RAM 502 or the HDD 503 may be used as the storage section 520. The storage section 520 stores a slice information table 521, a segment information table 522, logical volume configuration information 523, an access node list 524, and a restoration target list 525.

In the slice information table 521, metadata collected from the disk nodes 100, 200, 300, and 400 is registered. The metadata is information that indicates a segment allocated to each slice in the storage unit and a counterpart slice making up a pair. The slice information table 521 is generated by the slice information collection section 532 of the control section 530.

The segment information table 522 depicts information that indicates a slice allocated to each segment making up the logical volume. The segment information table 522 is generated by the slice information collection section 532 based on the metadata collected from the disk nodes 100, 200, 300, and 400.

The logical volume configuration information 523 defines the slice allocation relation to segments included in each logical volume defined in advance.

The access node list 524 depicts information that indicates whether each access node included in the multi-node storage system is operating normally. The contents of the access node list 524 are updated by the access node administration section 537.

The restoration target list 525 depicts information that indicates a segment serving as a target of recovery processing. The restoration target list 525 is generated by the restoration target extraction section 533 of the control section 530.

The control section 530 has a disk node monitoring section 531, a slice information collection section 532, a restoration target extraction section 533, a duplex control section 534, a logical volume configuration information administration section 535, an access node heart beat reception section 536, an access node administration section 537, and a configuration information change notification section 538.

The disk node monitoring section 531 is a processing section for monitoring whether the disk nodes 100, 200, 300, and 400 are operating normally. Specifically, the disk node monitoring section 531 receives a heart beat transmitted periodically from each of the disk nodes 100, 200, 300, and 400. At that time, the disk node monitoring section 531 stores the reception time of each heart beat in association with the disk node. When any disk node does not transmit a subsequent heart beat after the elapse of a specific time or longer relative to the last heart beat reception, the disk node monitoring section 531 determines that a fault has occurred in the disk node.

At start of operation of the system, the slice information collection section 532 collects the slice information from the disk nodes 100, 200, 300, and 400, and generates the slice information table 521 and the segment information table 522. Further, when the disk node monitoring section 531 has detected that an abnormality has occurred in any disk node, the slice information collection section 532 collects the slice information (a set of metadata) from the disk nodes under normal operation. Based on the collected slice information, the slice information collection section 532 newly generates the slice information table 521 and the segment information table 522.

When the disk node monitoring section 531 has detected a fault in a disk node, the restoration target extraction section 533 detects degenerated segments. Specifically, based on the segment information table 522 regenerated in accordance with the fault occurrence, the restoration target extraction section 533 extracts degenerated segments. The degenerated segment indicates a segment to which only one of a primary slice and a secondary slice is allocated. The restoration target extraction section 533 stores, into the restoration target list 525, the information that indicates the degenerated segments.

The duplex control section 534 controls the slice allocation to the degenerated segments so that the data duplex in the segments is maintained. That is, when a data duplex state breaks down in a segment owing to a fault in a disk node, recovery processing (duplex state recovery) is performed on the segment. In the recovery processing, a slice pair is reconstructed from a slice allocated to the degenerated segment and an empty slice in a storage administration device under normal operation, so that the data duplex state is recovered. Here, the empty slice indicates a slice to which any segment is not yet allocated. The recovery processing is divided into conversion-into-primary processing, empty slice allocation processing, and slice information update processing.

In the conversion-into-primary processing, the slices presently allocated to degenerated segments are converted into primary slices. Specifically, from the restoration target list 525 and the segment information table 522, the duplex control section 534 acquires the disk node ID and the slice ID of the slice allocated to each degenerated segment. The duplex control section 534 transmits an instruction of converting the slice indicated by each acquired slice ID into a primary slice, to the disk node having a storage unit corresponding to each acquired disk node ID. In each slice specified by the conversion-into-primary instruction, an attribute of the slice is changed into primary by the disk node having received the conversion-into-primary instruction.

The duplex control section 534 performs empty slice allocation processing. Specifically, the duplex control section 534 searches the slice information table 521 for empty slices belonging to storage units different from the storage unit that includes the slice presently allocated to the degenerated segment. The duplex control section 534 selects one of the obtained slices, and allocates the slice as the secondary slice of the degenerated segment.

Further, the duplex control section 534 transmits a data copy instruction to copy data into the slice adopted as the secondary slice, to the disk node administering the primary slice. The data copy instruction includes the disk node ID of the disk node administering the secondary slice and the slice ID of the secondary slice. The disk node having received the data copy instruction transfers the data in the primary slice to the disk node administering the secondary slice. The disk node having received the data stores the data in the secondary slice. This achieves data duplex in the degenerated segment.

The duplex control section 534 transmits a slice information update instruction to the disk nodes respectively administering the primary slice and the secondary slice of the degenerated segment. The duplex control section 534 deletes the contents of the restoration target list 525. The slice information update instruction includes the metadata of the slice allocated to the degenerated segment. Thus, based on the metadata included in the slice information update instruction, the disk node having received the slice information update instruction updates the metadata in the slice information storage section and in the storage unit.

The logical volume configuration information administration section 535 administers the logical volume configuration information 523. Specifically, with reference to the segment information table 522, the logical volume configuration information administration section 535 extracts information concerning primary slices among the information that indicates the allocation relation of the slices to individual segments in the logical volume. The logical volume configuration information administration section 535 generates the logical volume configuration information 523 including the information concerning the extracted primary slices. The logical volume configuration information administration section 535 stores the generated logical volume configuration information 523 into the storage section 520.

Further, in response to a logical volume configuration information reference request from the access nodes 600 and 700, the logical volume configuration information administration section 535 transmits the logical volume configuration information 523 to the access nodes 600 and 700.

The access node heart beat reception section 536 receives a heart beat from each of the access nodes 600 and 700. When receiving a heart beat, the access node heart beat reception section 536 notifies the access node administration section 537 of the access node information concerning the access node having transmitted the heart beat.

The access node administration section 537 administers access nodes in operation. Specifically, based on the information concerning the heart beat received from the access node heart beat reception section 536, the access node administration section 537 determines the identification information (IP address or the like) of the access node having outputted the heart beat. When the access node having outputted the heart beat is not registered in the access node list 524, the access node administration section 537 adds and registers the access node into the access node list 524.

Further, the access node administration section 537 determines whether or not a heart beat arrives periodically from each access node registered in the access node list 524. When a heart beat from any access node has stopped for a specific time or longer, the access node administration section 537 deletes the access node from the access node list 524.

When the logical volume configuration information 523 is updated by the logical volume configuration information administration section 535, the configuration information change notification section 538 notifies the access nodes presently under normal operation that the logical volume configuration information 523 has been updated. Here, the configuration information change notification section 538 determines the access nodes under normal operation, by referring to the access node list 524.

The information stored in the storage section 520 is described below in detail.

FIG. 11 is a diagram depicting an example of the data structure of the slice information table. The slice information table 521 has the fields of disk node ID, slice ID, status, logical volume ID, segment ID, counterpart disk node ID, and counterpart slice ID. Information located in the horizontal direction in the slice information table 521 is associated with each other, and make up one record that represents metadata. The information set in each field in the slice information table 521 is information of the same kind as that in the field having the same name in the metadata table 141 depicted in FIG. 9. However, in contrast to the metadata table 141 in the disk node 100, in the slice information table 521, metadata included in the entire slice information collected from the plurality of disk nodes 100, 200, 300, and 400 is registered.

FIG. 12 is a diagram depicting an example of the data structure of the segment information table 522. The segment information table 522 has the fields of logical volume ID, segment ID, primary slice information, and secondary slice information.

In the logical volume ID field, the identification information (logical volume ID) for a logical volume defined in the multi-node storage system is set. In the segment ID field, identification information (a segment ID) for a segment defined in a logical volume is set.

In the primary slice information field, information concerning a primary slice allocated to the corresponding segment is set. The information concerning a primary slice includes a disk node ID and a slice ID. The disk node ID serving as the information concerning a primary slice is identification information for a disk node administering a slice allocated as the primary slice. The slice ID serving as the information concerning the primary slice is identification information for a slice allocated as the primary slice.

In the secondary slice information field, information concerning a secondary slice allocated to the corresponding segment is set. The information concerning a secondary slice includes a disk node ID and a slice ID. The disk node ID serving as the information concerning a secondary slice is identification information for a disk node administering a slice allocated as the secondary slice. The slice ID serving as the information concerning the secondary slice is identification information for a slice allocated as the secondary slice.

FIG. 13 is a diagram depicting an example of the data structure of the logical volume configuration information. The logical volume configuration information 523 has the fields of logical volume ID, segment ID, and slice information. The information set in each field of the logical volume configuration information 523 is information of the same kind as that in the field having the same name in the metadata table 141 depicted in FIG. 9.

Figure 14:
FIG. 14 is a diagram depicting an example of a data structure of an access node list.

FIG. 14 is a diagram depicting an example of the data structure of the access node list. The access node list 524 has the fields of access node ID, IP address, port number, and heart beat reception date and time. Information located in the horizontal direction in the table is associated with each other. One record including the information pieces associated with each other makes up one piece of access node information.

In the access node ID field, an identification number is set for uniquely identifying an access node under operation within the multi-node storage system. In the IP address field, the IP address of the access node is set. In the port number field, an IP port number corresponding to the logical volume access control section in the access node is set.

In the heart beat reception time field, information that indicates the reception time of a heart beat outputted from the corresponding access node is set.

Next, the restoration target list 525 is described below. The restoration target list 525 is generated based on the segment information table when a fault is detected in a disk node. Here, it is assumed that a fault occurs in the disk node 100 (the situation depicted in FIG. 6). In this case, slices administered by the disk node 100 may not be accessed. Thus, the segment information table 522 is updated.

FIG. 15 is a diagram depicting an example of the segment information table at fault occurrence. When a fault occurs in the disk node 100, the information concerning the slices in the disk node 100 is deleted from the segment information table 522. As a result, segments to each of which only one of a primary slice and a secondary slice is allocated are generated. Such degenerated segments are selected as restoration target segments, and then the restoration target list 525 is generated.

FIG. 16 is a diagram depicting an example of the data structure of the restoration target list. The restoration target list 525 has the fields of logical volume ID and segment ID. In the logical volume ID field, the identifier (logical volume ID) of a logical volume to which a restoration target segment belongs is set. In the segment ID field, the identification information of a segment that is degenerated and requires restoration to the data duplex state is set.

In the segment information table 522 depicted in FIG. 15, four segments in the logical volume 60 having the logical volume ID "LVOL-X" are degenerated. Thus, the four segments depicted in FIG. 16 are registered in the restoration target list 525.

Next, the function of the access nodes 600 and 700 is described below.

Figure 17:
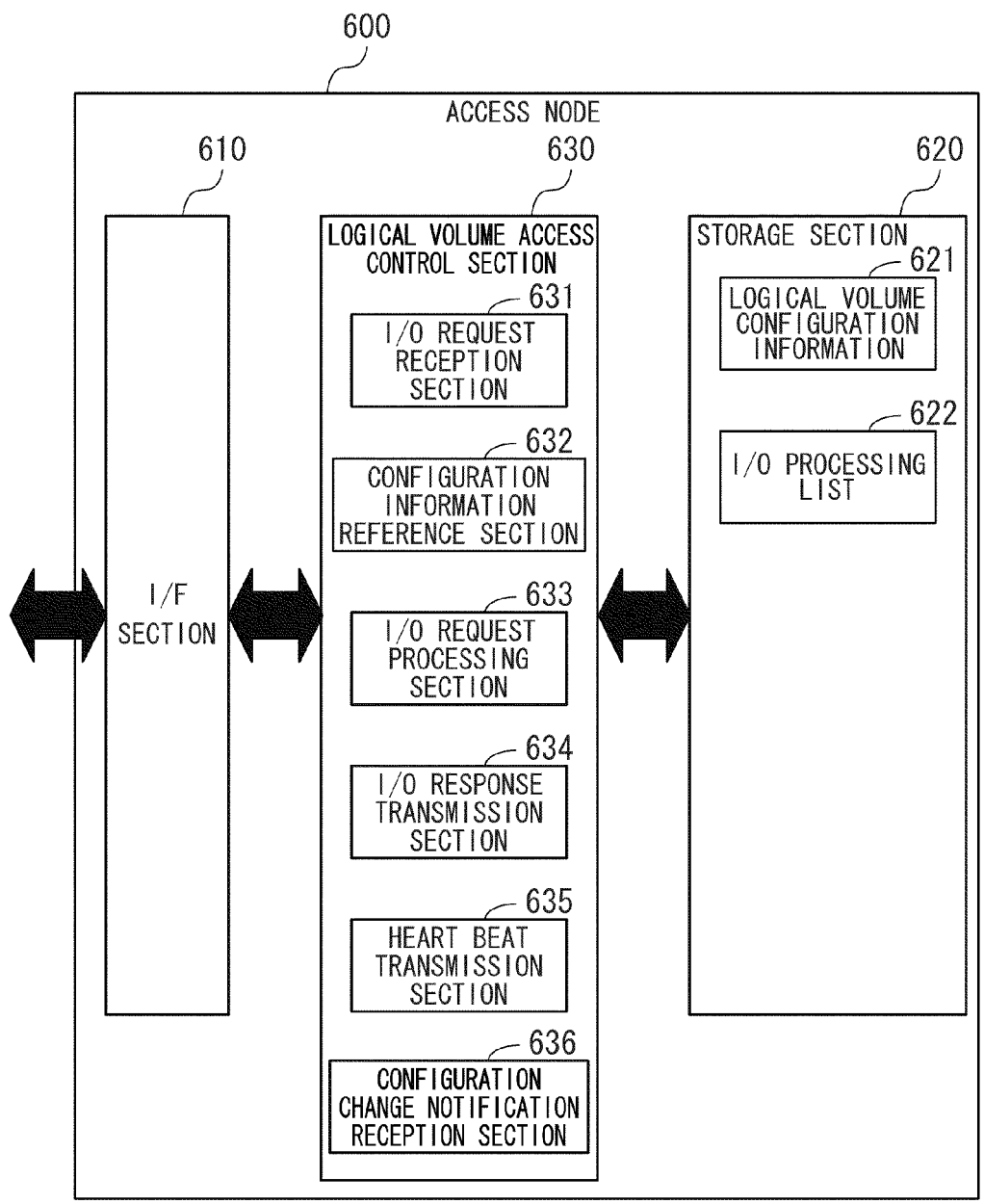
FIG. 17 is a block diagram depicting a function of an access node.

FIG. 17 is a block diagram depicting the function of an access node 600. The access node 600 has an interface (I/F) section 610, a storage section 620, and a logical volume access control section 630. The I/F section 610 implements a communication function of performing data communication with the disk nodes 100, 200, 300, and 400, the control node 500, and the administration node 50 via the network 10 based on a specific communication protocol.

The storage section 620 implements a storage function for storing various kinds of information. For example, a part of the storage area of the RAM 502 or the HDD 503 may be used as the storage section 620. The storage section 620 stores logical volume configuration information 621 and an I/O processing list 622. The logical volume configuration information 621 is information concerning a primary slice allocated to each segment in the logical volume used by the access node 600. Here, the data structure and the contents of the logical volume configuration information 621 are similar to the data structure and the contents of the logical volume configuration information 523 depicted in FIG. 13.

The I/O processing list 622 depicts information that indicates the contents of I/O processing performed on the disk nodes 100, 200, 300, and 400 in response to I/O requests from the terminal units 21, 22, and 23.

In response to an I/O request to the logical volume from the terminal units 21, 22, and 23 or the like, the logical volume access control section 630 accesses the slice corresponding to the segment specified in the I/O request. The logical volume access control section 630 has an I/O request reception section 631, a configuration information reference section 632, an I/O request processing section 633, an I/O response transmission section 634, a heart beat transmission section 635, and a configuration change notification reception section 636.

The I/O request reception section 631 receives an I/O request from the terminal units 21, 22, and 23 or the like. The I/O request reception section 631 transfers the received I/O request to the I/O request processing section 633.

The configuration information reference section 632 may refer to the logical volume configuration information 523 in the control node 500. For example, at startup of the access node 600, the configuration information reference section 632 transmits, to the control node 500, a reference request for the logical volume configuration information table 523 so as to acquire the information in the logical volume configuration information 523. In this case, the configuration information reference section 632 stores, into the storage section 620, the logical volume configuration information 621 having the same contents as the acquired logical volume configuration information 523. Further, also when information indicating that the configuration in the logical volume configuration information 523 has been changed is received from the configuration change notification reception section 636, the configuration information reference section 632 transmits, to the control node 500, a reference request to reference the logical volume configuration information 523 so as to acquire the logical volume configuration information 523. In this case, the configuration information reference section 632 updates the contents of the logical volume configuration information 621 to match the contents acquired from the logical volume configuration information 523.

The I/O request processing section 633 executes I/O processing based on the I/O request transferred from the I/O request reception section 631. Specifically, with reference to the logical volume configuration information 621, the I/O request processing section 633 determines a disk node serving as the access destination corresponding to the I/O request and a slice administered by the disk node. Further, the I/O request processing section 633 transmits, to the corresponding disk node, a slice-specified I/O request (a read request or a write request) that specifies a slice in the disk node. The I/O request processing section 633 stores, into the I/O processing list 622, the contents of the executed I/O request.

The I/O response transmission section 634 acquires an I/O response from the disk node having transmitted the slice-specified I/O request, and transmits the acquired response to the terminal unit having outputted, to the logical volume, the I/O request.

The heart beat transmission section 635 periodically transmits a heart beat to the control node 500.

The configuration change notification reception section 636 receives, from the control node 500, a configuration information change notification of the logical volume. When receiving the configuration information change notification, the configuration change notification reception section 636 notifies the situation to the configuration information reference section 632.

Here, FIG. 17 depicts the function of the access node 600. However, the access node 700 also has a similar function.

Next, details of the I/O processing list 622 are described below.

Figure 18:
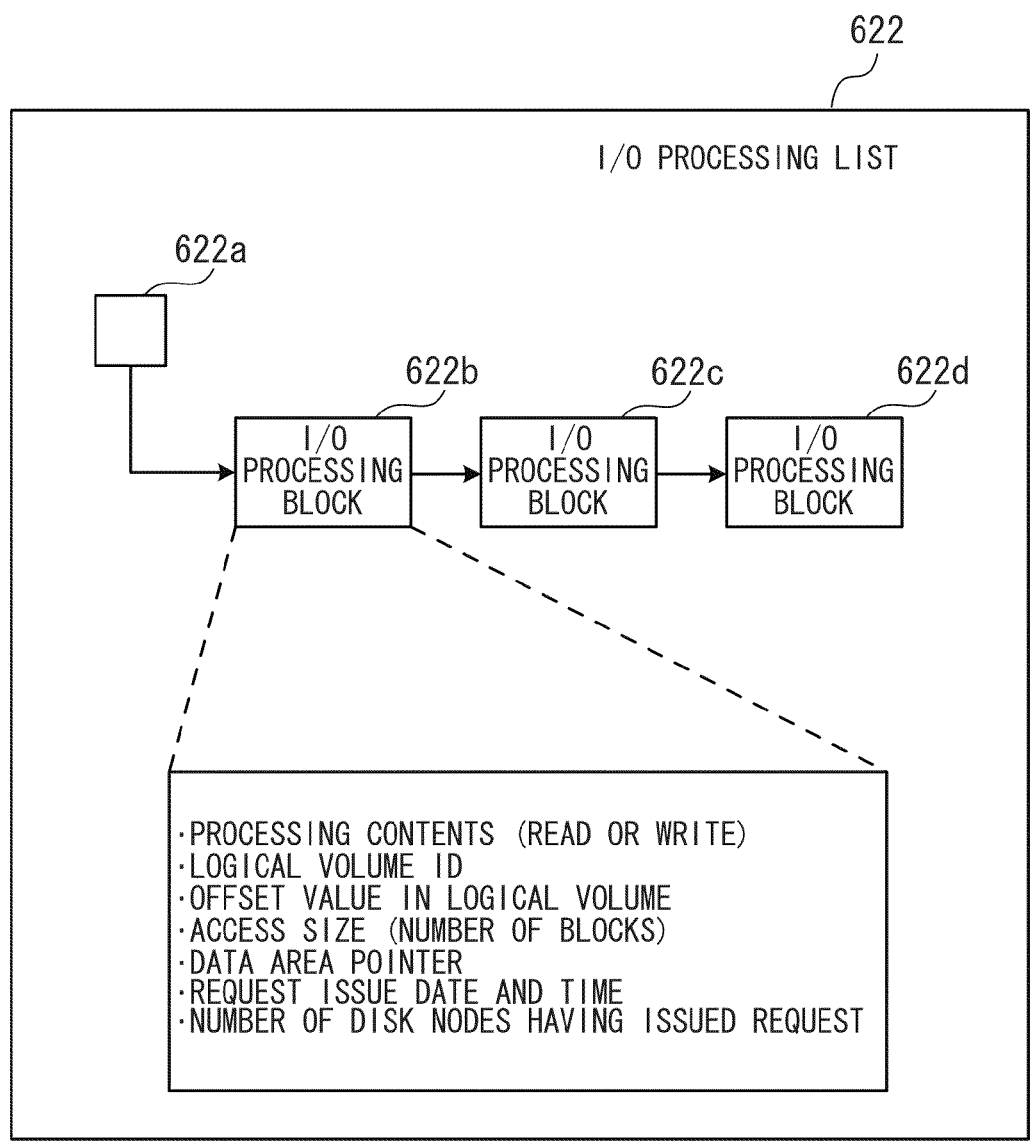
FIG. 18 is a diagram depicting an example of a data structure of an I/O processing list.

FIG. 18 is a diagram depicting an example of the data structure of the I/O processing list. The I/O processing list 622 stores I/O processing blocks 622b, 622c, and 622d in the form of a queue.

A queue top 622a is provided in the I/O processing list 622. In the queue top 622a, a pointer (information indicating the beginning of the storing region for the I/O processing block) pointing to the I/O processing block 622b whose order of processing is the earliest is set. Each of the I/O processing blocks 622b, 622c, and 622d has a pointer pointing to the I/O processing block to be processed next. Thus, the plurality of I/O processing blocks 622b, 622c, and 622d are arranged in order starting from the queue top 622a.

After transmitting a slice-specified I/O request to the disk node, the I/O request processing section 633 registers, into the I/O processing list 622, an I/O processing block in accordance with the I/O request received from the terminal unit. The I/O request processing section 633 sets a pointer pointing to the newly registered I/O processing block into the I/O processing block 622d at the end of the queue.

The I/O processing block 622b includes information such as the contents of processing, a logical volume ID, an offset value in the logical volume, an access size (the number of blocks), a data area pointer, a request issue time, and a number of disk nodes to which a request has been issued.

The contents of processing is information indicating whether the I/O request is a read request or a write request. The logical volume ID is the identifier of the logical volume of an accessing target. The offset value in the logical volume is the difference (offset value) between the address of the beginning of the logical volume and the address of the beginning of the data of accessing target. The accessing target segment may uniquely be identified based on the offset value. For example, when the size of a segment is 1 gigabyte, and when the offset value is smaller than 1 gigabyte, the first segment 61 in the logical volume 60 is the accessing target. Alternatively, when the size of a segment is 1 gigabyte, and when the offset value is 1 gigabyte or greater and smaller than 2 gigabytes, the second segment 62 is the accessing target.

The access size indicates the data size of the accessing target. The data size is specified by the number of blocks each of which is the minimum unit of accessing.

The data area pointer is information indicating the address of the beginning of the storing region for the data serving as the processing target of the I/O request. When the I/O request is a read request, the data area pointer indicates the storing region for the read data. Further, when the I/O request is a write request, the data area pointer indicates the storing region for the data to be written.

The request issue time is information indicating the time of reception of the I/O request. The number of disk nodes to which an I/O request has been issued indicates the number of disk nodes to which a slice-specified I/O request has been transmitted in response to the I/O request specified by address in the logical volume. When an I/O request to data distributed in a plurality of segments is received, a plurality of slice-specified I/O requests corresponding to the individual segments is transmitted. Thus, in some cases, slice-specified I/O requests to a plurality of disk nodes are transmitted in response to a single I/O request.

Next, the processing performed between the access node 600 and the control node 500 is described below in detail.

Figure 19:
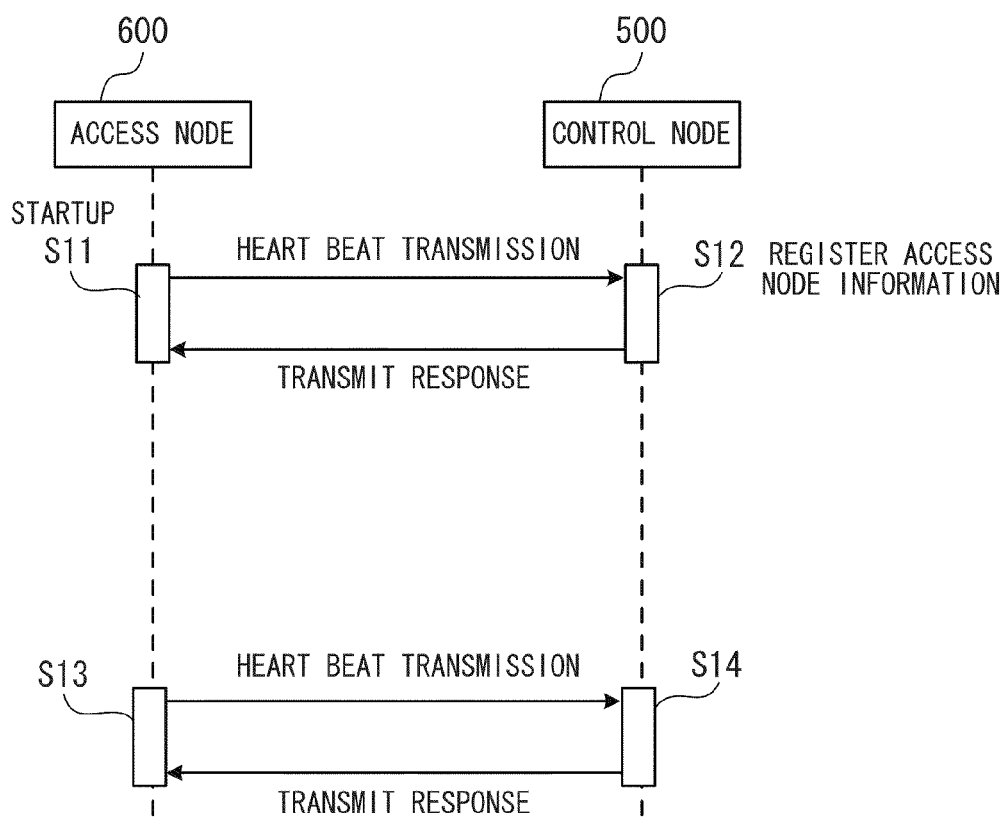
FIG. 19 is a sequence diagram depicting a procedure of processing of access node registration into an access node list.

FIG. 19 is a sequence diagram depicting processing of access node registration into the access node list. When starting up, the access node 600 executes transmission of a heart beat to the control node 500 (step S11). Specifically, the heart beat transmission section 635 in the access node 600 transmits a heart beat to the control node 500, and then awaits a response. Here, the heart beat may include information (such as the access node ID, the IP address, and the port number) concerning the access node 600 or the logical volume access control section 630 in the access node 600.

In response to the heart beat from the access node 600, the control node 500 performs the processing of registration of the access node information into the access node list (step S12). Specifically, the access node heart beat reception section 536 receives a heart beat from the access node 600. The access node heart beat reception section 536 transfers, to the access node administration section 537, the access node information concerning the access node 600 having transmitted the heart beat. With reference to the access node list 524, the access node administration section 537 confirms that the heart beat is from an unregistered access node. The access node administration section 537 registers, into the access node list 524, the access node information concerning the access node 600. At that time, the access node administration section 537 records the heart beat reception time for the access node 600. Further, the access node heart beat reception section 536 transmits, to the access node 600, a response to the heart beat.

When the heart beat transmission section 635 of the access node 600 receives the response from the control node 500, one cycle of heart beat transmission processing is completed. When the heart beat transmission processing is completed, the heart beat transmission section 635 starts time measurement. When the measured time reaches a heart beat interval set in advance, the heart beat transmission section 635 performs the next heart beat transmission processing (step S13).

The control node 500 having received the second heart beat performs activeness confirmation processing for the access node 600 (step S14). Specifically, similar to the first occasion, the access node heart beat reception section 536 of the control node 500 receives the heart beat, and transfers the heart beat to the access node administration section 537. With reference to the access node list 524, the access node administration section 537 confirms that the heart beat is from an already registered access node. Then, the access node administration section 537 updates the heart beat reception time of the access node 600 in the access node list 524. Further, the access node heart beat reception section 536 transmits, to the access node 600, a response to the heart beat.

Here, when no subsequent heart beat is received even after the elapse of a specific error detection time relative to the heart beat reception time for the access node 600, the access node administration section 537 determines that the access node 600 has stopped. In this case, the access node administration section 537 deletes the access node information concerning the access node 600 from the access node list 524.

As such, activeness confirmation for the access node 600 is performed by the control node 500 based on the heart beat from the access node 600. The processing performed by the control node 500 when a heart beat is received is described below in detail.

The processing performed by the access node heart beat reception section 536 is described first.

Figure 20:
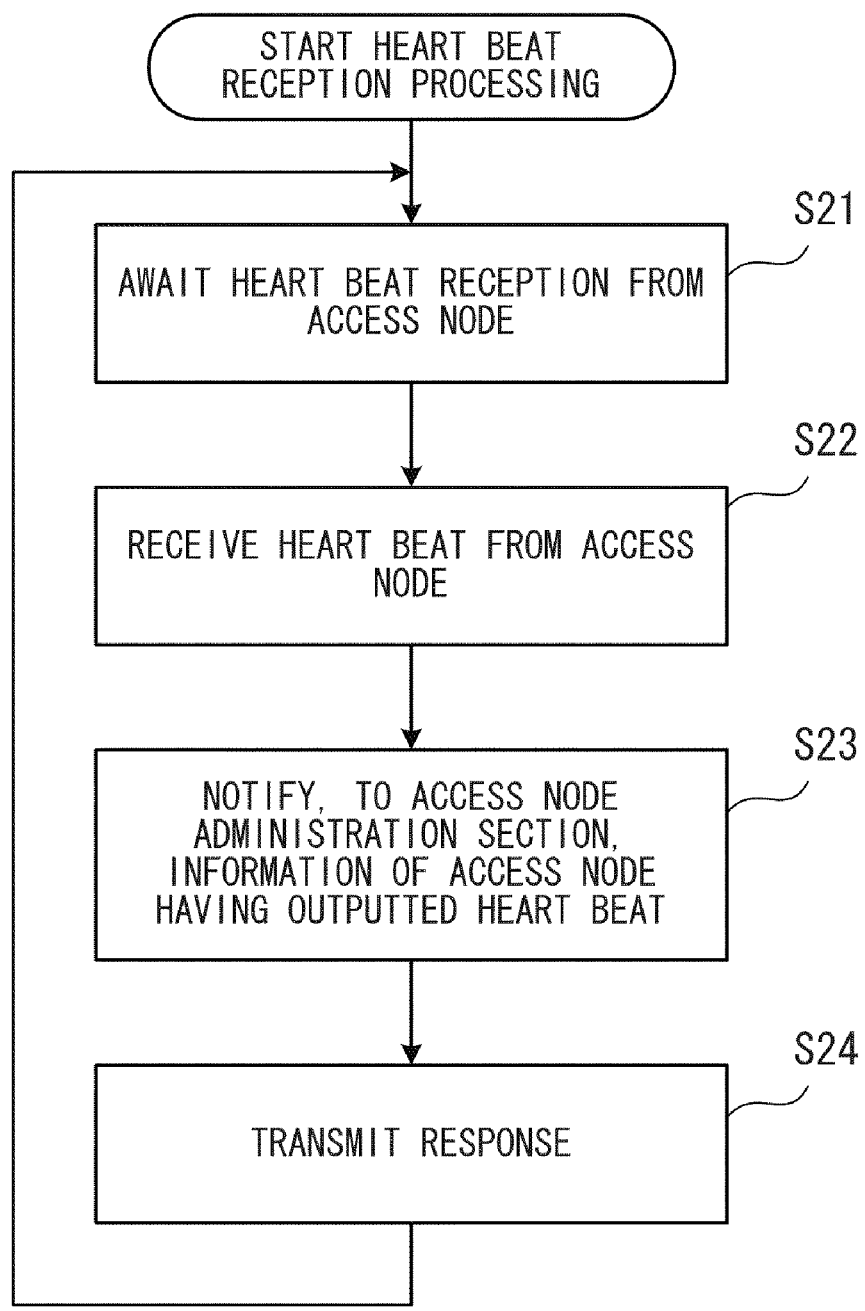
FIG. 20 is a flow chart depicting a procedure of heart beat reception processing.

FIG. 20 is a flow chart depicting a procedure of the heart beat reception processing. The processing depicted in FIG. 20 is described below.

[Step S21] The access node heart beat reception section 536 awaits reception of a heart beat from an access node.

[Step S22] The access node heart beat reception section 536 receives a heart beat from an access node.

[Step S23] The access node heart beat reception section 536 notifies, to the access node administration section 537, the access node information concerning the access node having outputted the heart beat.

[Step S24] The access node heart beat reception section 536 transmits a response to the access node having outputted the heart beat. Then, the processing goes to step S21.

Next, the access node check processing performed by the access node administration section 537 is described below.

Figure 21:
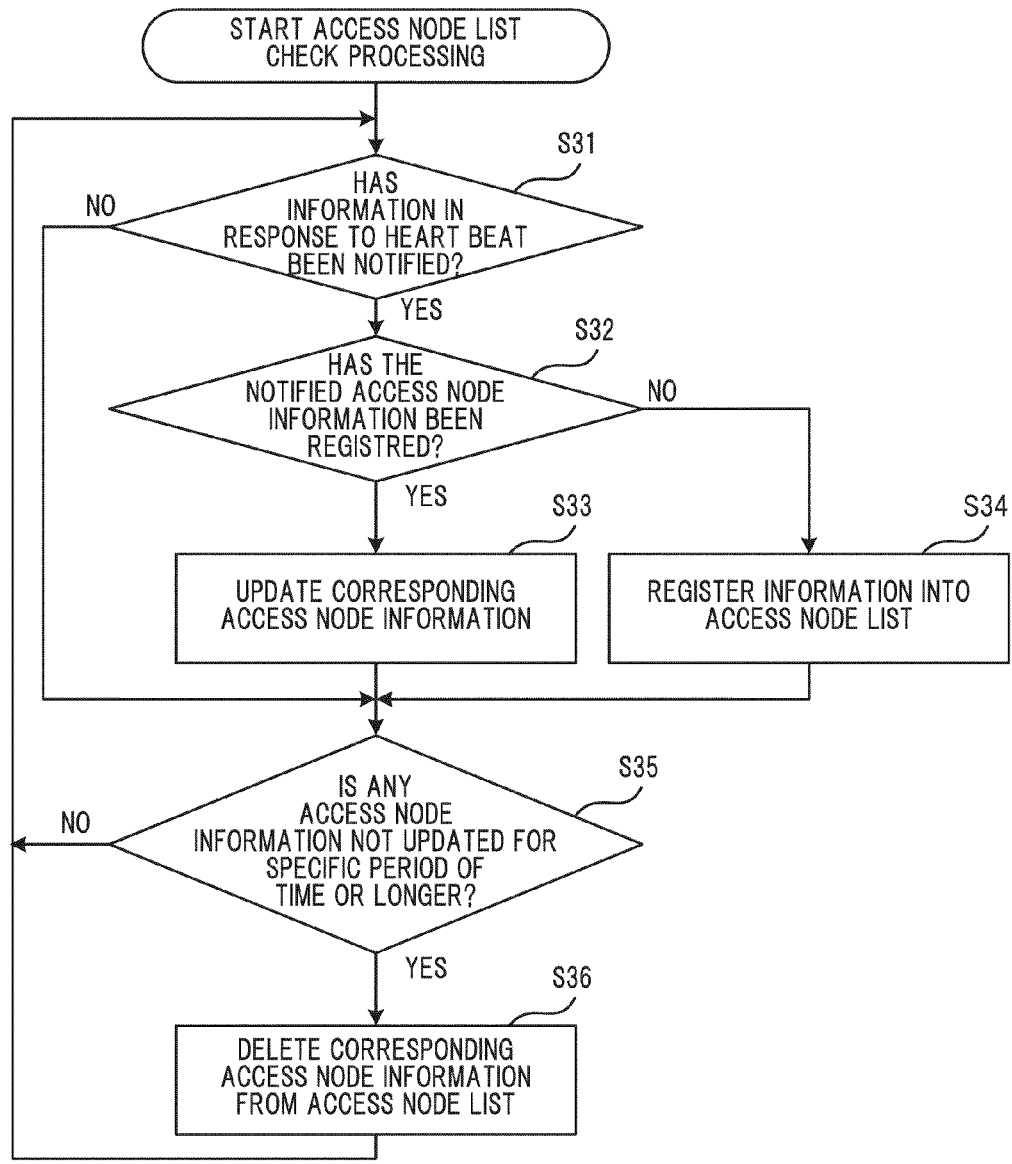
FIG. 21 is a flow chart depicting a procedure of access node list check processing.

FIG. 21 is a flow chart depicting a procedure of access node list check processing. The processing depicted in FIG. 21 is described below.

[Step S31] The access node administration section 537 determines whether access node information corresponding to the heart beat reception has been notified from the access node heart beat reception section 536. When the access node information has been notified, the processing goes to step S32. When the access node information is not yet notified, the processing goes to step S35.

[Step S32] When receiving the access node information from the access node heart beat reception section 536, the access node administration section 537 determines whether or not the notified access node information has already been registered in the access node list 524. In case of having been registered, the processing goes to step S33. In case of being not yet registered, the processing goes to step S34.

[Step S33] When the notified access node information has already been registered in the access node list 524, the access node administration section 537 updates the heart beat reception time of the corresponding access node into the present time. Then, the processing goes to step S35.

[Step S34] When the notified access node information is not yet registered in the access node list 524, the access node administration section 537 registers the acquired access node information to the access node list 524. At that time, the access node administration section 537 adds the present time as the heart beat reception time into the newly registered access node information.

[Step S35] The access node administration section 537 determines whether or not any access node information has not been updated for a specific time or longer. Specifically, the access node administration section 537 compares, with the present time, the heart beat reception time included in each piece of access node information in the access node list 524. When the time difference exceeds a threshold value for the heart beat stoppage detection set in advance, the access node administration section 537 determines that the corresponding access node information has not been updated for a specific time or longer. In case of the presence of such access node information, the processing goes to step S36. In case of the absence of such access node information, the processing goes to step S31.

[Step S36] When any access node information is not updated for a specific time or longer, the access node administration section 537 deletes the corresponding access node information from the access node list 524. Then, the processing goes to step S31.

As such, since a heart beat is outputted from each access node, the control node 500 may recognize access nodes under operation. That is, the contents of the access node list 524 may be updated in real time. Thus, when the contents of the logical volume configuration information 523 are updated, with reference to the access node list 524, the control node 500 may transmit a notification indicating that the configuration information has been updated, to the access nodes under operation.

Figure 22:
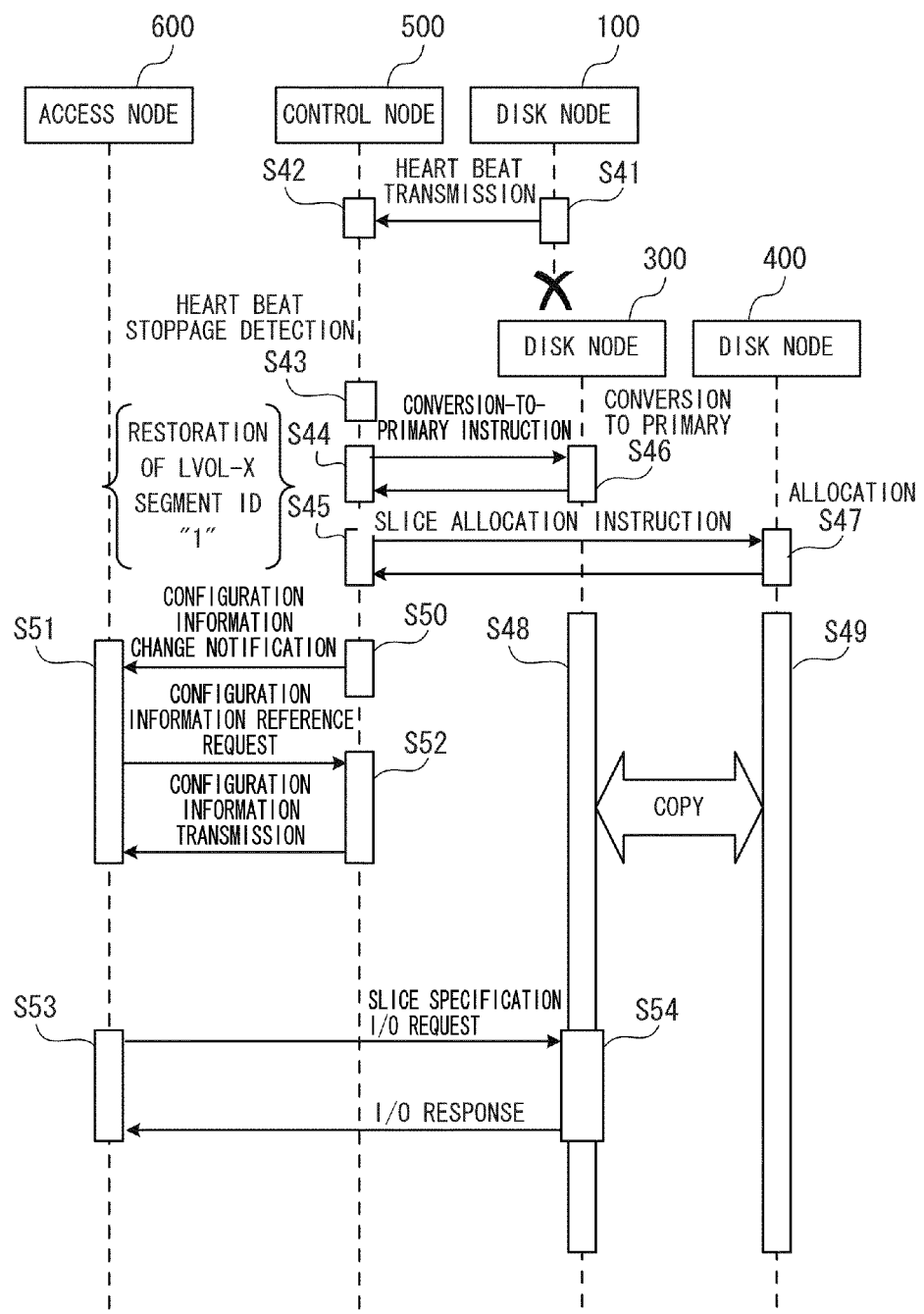
FIG. 22 is a sequence diagram depicting a processing procedure performed at the time of logical volume configuration information change.

FIG. 22 is a sequence diagram depicting a processing procedure performed at the time of logical volume configuration information change. The example of FIG. 22 depicts the processing of restoration of the data duplex state of the segment of ID "1" in the logical volume 60 (see FIG. 4) performed when a fault occurs in the disk node 100.

During the normal operation, the heart beat transmission section 152 of the disk node 100 continues to periodically transmit a heart beat to the control node 500 (step S41). When receiving the heart beat from the disk node 100, the disk node monitoring section 531 of the control node 500 recognizes that the disk node 100 is operating normally (step S42).

Here, it is assumed that a fault occurs in the disk node 100 and hence the heart beat stops. In this case, since the heart beat from the disk node 100 stops for a specific time or longer, the disk node monitoring section 531 of the control node 500 detects the fault occurrence in the disk node 100 (step S43). The slice information collection section 532 of the control node 500 collects the newest slice information from the disk nodes 200, 300, and 400 under normal operation, and reconstructs the slice information table 521. Then, based on the reconstructed slice information table 521, the duplex control section 534 updates the segment information table 522. The contents of the updated segment information table 522 are as depicted in FIG. 15.

Based on the segment information table 522, the duplex control section 534 determines degenerated segments. Here, when attention is focused on the segment of segment ID "1", no primary slice is allocated. Thus, the duplex control section 534 determines the conversion of the present secondary slice of the segment of segment ID "1" into a primary slice and the allocation of a new secondary slice. Here, as depicted in FIG. 6, it is assumed that the slice of slice ID "2" in the disk node 400 is allocated as the secondary slice.

In accordance with the change in the slice allocation to the segment, the duplex control section 534 issues an instruction of converting the slice into a primary slice to the disk node 300 that administers the secondary slice of the segment of segment ID "1" (step S44). At that time, the information concerning the secondary slice of the segment of segment ID "1" is also notified to the disk node 300. For example, the duplex control section 534 may transmit, to the disk node 300, the metadata obtained after the conversion of the to-be-converted slice into a primary slice, so as to notify a conversion-into-primary instruction and the information concerning the secondary slice. The data structure of the transmitted metadata is similar to that of the metadata depicted in FIG. 9.

Further, the duplex control section 534 issues, to the disk node 400, an instruction of allocating the slice of slice ID "2" in the disk node 400 to the secondary slice of the segment of segment ID "1" (step S45). At that time, the information concerning the primary slice of the segment of segment ID "1" is also notified to the disk node 400. For example, the duplex control section 534 may transmit, to the disk node 400, the metadata obtained after the allocation of the to-be-newly-allocated slice, so as to notify a slice allocation instruction and the information concerning the primary slice. The data structure of the transmitted metadata is similar to that of the metadata depicted in FIG. 9.

The disk node 300 performs conversion of the specified slice into a primary slice (step S46). Specifically, the disk node 300 updates the slice information held inside, so as to register that the specified slice (slice ID "2") is allocated as a primary slice to the segment of segment ID "1". Further, the disk node 300 registers, as slice information, that the slice allocated as the counterpart of the slice of slice ID "2" administered by the local node is the slice of slice ID "2" in the disk node 400. The disk node 300 returns the completion of update of slice information to the control node 500.

The disk node 400 performs allocation of the specified slice to the segment (step S47). Specifically, the disk node 400 updates the slice information held inside, so as to register that the specified slice (slice ID "2") is allocated as a secondary slice to the segment of segment ID "1". Further, the disk node 400 registers, as slice information, that the slice allocated as the counterpart of the slice of slice ID "2" administered by the local node is the slice of slice ID "2" in the disk node 300. The disk node 400 returns the completion of the update of slice information to the control node 500.

After that, the disk node 300 transmits the data in the slice having been converted into the primary slice, to the disk node 400 that administers the slice serving as the counterpart (step S48). The disk node 400 stores the data transmitted from the disk node 300 into the slice newly allocated as the secondary slice (step S49). As a result, the data of the degenerated segment is copied so that the data duplex state is restored.

In the control node 500, the duplex control section 534 updates the slice information table 521 and the segment information table 522. Further, the logical volume configuration information administration section 535 updates the logical volume configuration information 523. By referencing the access node list 524, the configuration information change notification section 538 transmits a configuration information change notification to the access node 600 under operation (step S50).

Here, in the example of FIG. 22, step S50 is performed after step S45. However, the processing from step S50 to step S52 may be performed on completion of step S44 without awaiting the completion of the processing at step S45. This permits rapid execution of configuration information change notification. Here, the reason why waiting for the completion of the processing at step S45 may be avoided is that in the logical volume configuration information to be held by the access node, information concerning primary slices alone is sufficient and information concerning secondary slices is unnecessary.

In the access node 600, the configuration change notification reception section receives the configuration information change notification. Then, logical volume configuration information update processing is performed (step S51). In the logical volume configuration information update processing, first, the configuration information reference section 632 transmits a configuration information reference request to the control node 500. In the control node 500, in response to the configuration information reference request, the logical volume configuration information administration section 535 transmits the logical volume configuration information 523 to the access node 600 (step S52). In the access node 600, the configuration information reference section 632 receives the logical volume configuration information 523 transmitted from the control node 500, and then updates the logical volume configuration information 621 administered by the local node.

After that, it is assumed that in the access node 600, an I/O request is generated to the segment of segment ID "1" in the logical volume 60 of logical volume identifier "LVOL-X". I/O processing is executed in the access node 600 (step S53). For example, an I/O request is outputted from the terminal unit 21, and the I/O request reception section 631 of the access node 600 receives the I/O request. By referencing the logical volume configuration information 621, the I/O request processing section 633 checks a slice allocated as the primary slice of the accessing target segment. The I/O request processing section 633 transmits a slice-specified I/O request to the disk node 300 that administers the corresponding slice. In the disk node 300, data access corresponding to the slice-specified I/O request is performed, and an I/O response is transmitted to the access node (step S54).

Next, the processing procedures of configuration information change notification processing in the control node 500 and logical volume configuration information update processing in the access node 600 are described below in detail.

Figure 23:
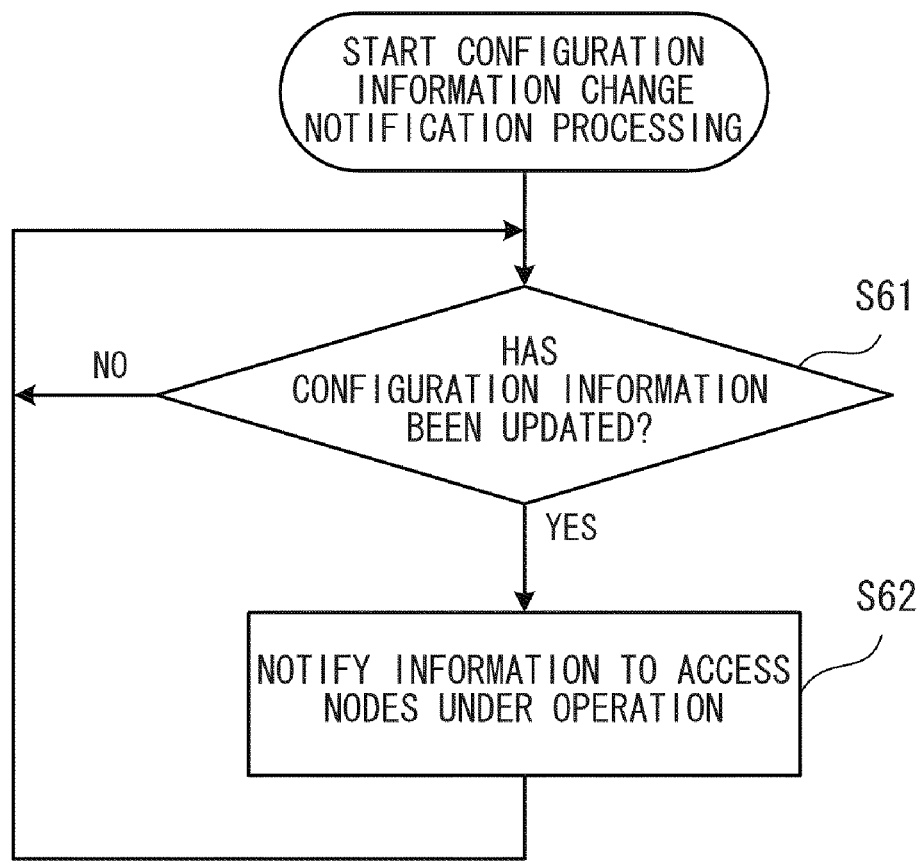
FIG. 23 is a flow chart depicting a procedure of configuration information change notification processing in a control node.

FIG. 23 is a flow chart depicting a procedure of configuration information change notification processing in the control node. The processing depicted in FIG. 23 is described below.

[Step S61] The configuration information change notification section 538 of the control node 500 determines whether the logical volume configuration information 523 has been updated. When the logical volume configuration information 523 has been updated, the processing goes to step S62. When the logical volume configuration information 523 is not yet updated, the processing at step S61 is repeated.

[Step S62] The configuration information change notification section 538 transmits a configuration information change notification to the access nodes under operation. Specifically, with reference to the access node list 524, the configuration information change notification section 538 acquires the access node information registered in the access node list 524. The configuration information change notification section 538 specifies, as the destination, the IP address and the port number depicted in the acquired access node information, and then transmits a configuration information change notification. Then, the processing goes to step S61.

Figure 24:
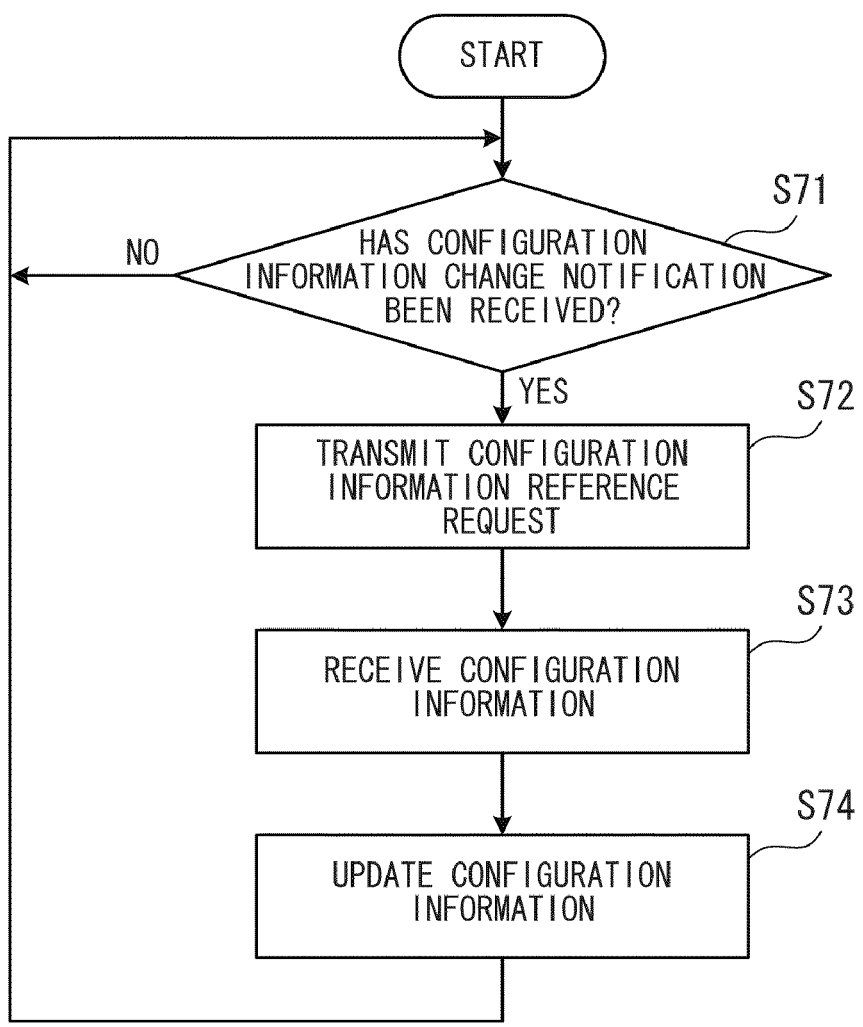
FIG. 24 is a flow chart depicting a procedure of logical volume configuration information update processing in an access node.

FIG. 24 is a flow chart depicting a procedure of logical volume configuration information update processing in the access node. The processing depicted in FIG. 24 is described below in the order of step numbers.

[Step S71] The configuration change notification reception section 636 of the access node 600 determines whether or not a configuration information update notification has been received. When a configuration information change notification has been received, the processing goes to step S72. When a configuration information change notification is not yet received, the processing at step S71 is repeated.

[Step S72] The configuration information reference section 632 transmits a configuration information reference request to the control node 500.

[Step S73] The configuration information reference section 632 receives the logical volume configuration information 523 transmitted from the control node 500.

[Step S74] The configuration information reference section 632 updates the logical volume configuration information 621 into similar contents as the received logical volume configuration information 523. As a result, the logical volume configuration information 621 of the access node 600 is updated into the newest state. Then, the processing goes to step S71.

As such, the logical volume configuration information in the access nodes 600 and 700 may be updated without waiting for the generating of an I/O request to the segment whose slice allocation has been changed. By virtue of this, even when a change arises in slice allocation to logical volumes in association with recovery processing or the like, a rapid reply is achieved to a subsequent I/O request to the segment whose allocation has been changed.

Further, even when a large number of segments simultaneously enter a degenerated state like in the case of fault occurrence in a disk node, the logical volume configuration information in the access nodes 600 and 700 is updated into the newest state with respect to all segments. Thus, in comparison with the case that information indicating the allocation relation of each segment is updated at each time of generation of an I/O request to the segment, the amount of messages may be reduced. This improves the overall processing efficiency in the multi-node storage system. That is, the number of messages to be exchanged via the network 10 when the logical volume configuration information is changed is reduced. This permits rapid processing in correspondence to I/O requests. As a result, the response time to data access from users is reduced.

Further, the heart beats from the access nodes 600 and 700 are monitored, and the access node list is updated automatically. This avoids the time and work of editing the access node list which, otherwise, may need to be performed by a system administrator. Further, when an access node is newly added to the multi-node storage system, the information concerning the access node is automatically added to the access node list. This avoids mistakes in transmission of the logical volume configuration information to the access nodes. Further, when the operation of an access node stops, the information concerning the access node is automatically deleted from the access node list. This avoids useless transmission of the logical volume configuration information. This improves the overall operation efficiency of the system.

Second Embodiment

Next, a second embodiment is described below. In the second embodiment, a push type of logical volume information update processing is performed. Here, the push type indicates a communication method in which, without awaiting reference requests from access nodes, the control node transmits the logical volume configuration information to the access nodes.

Here, the configuration of a multi-node storage system according to the second embodiment is similar to the configuration of the first embodiment depicted in FIG. 2. Further, the components provided in the disk nodes, the control node, and the access nodes according to the second embodiment are similar to those in the individual nodes according to the first embodiment depicted in FIGS. 8, 10, and 17. Thus, differences in the functions of the components according to the second embodiment from those according to the first embodiment are described below by using the reference numerals assigned to the components in FIGS. 8, 10, and 17.

First, for the purpose of the push type logical volume information update processing, the control node 500 administers which access node uses which logical volume. Thus, the access node list is extended in the second embodiment.

FIG. 25 is a diagram depicting an example of the data structure of the access node list according to the second embodiment. The access node list 524a has a logical volume ID field in addition to the fields of access node ID, IP address, port number, and heart beat reception time.

In the logical volume ID field, the identifier (logical volume ID) of the logical volume used by each access node is set. The logical volume used by each access node may be notified, for example, together with a heart beat from each access node. In this case, the heart beat transmission section 635 of the access node adds, to the heart beat, the access node information including the logical volume ID of the logical volume used by the local node, and then periodically transmits the heart beat to the control node 500. In the control node 500, the access node heart beat reception section 536 receives the heart beat. Then, based on the access node information added to the heart beat, the access node administration section 537 updates the access node list 524a.

Here, in the first embodiment, the entirety of the updated logical volume configuration information has been transmitted to the access nodes. In contrast, in the second embodiment, only information concerning segments whose primary slices have been changed is transmitted so that the amount of communication is reduced. The presence or absence of a change in primary slices may be administered for example, in the restoration target list 525a.

FIG. 26 is a diagram depicting an example of the restoration target list according to the second embodiment. The restoration target list 525a according to the second embodiment has a primary update flag field in addition to the fields of logical volume ID and segment ID.

In the primary update flag field, a flag (primary update flag) that indicates the presence or absence of a change in the primary slice is set. When the primary update flag is "1", this indicates that the primary slice has been changed. When the primary update flag is "0", this indicates that the primary slice is not yet changed.

The primary update flag is set when the restoration target extraction section 533 generates the restoration target list 525a. Specifically, when detecting a degenerated segment with reference to the segment information table 522, the restoration target extraction section 533 determines whether the primary slice is lost or alternatively whether the secondary slice is lost. When the primary slice is lost, the restoration target extraction section 533 sets the primary update flag to be "1" for the corresponding segment in the restoration target list 525a.

Next, description is given for the processing performed by the configuration information change notification section 538 when the logical volume configuration information is transmitted by the push-type method.

Figure 27:
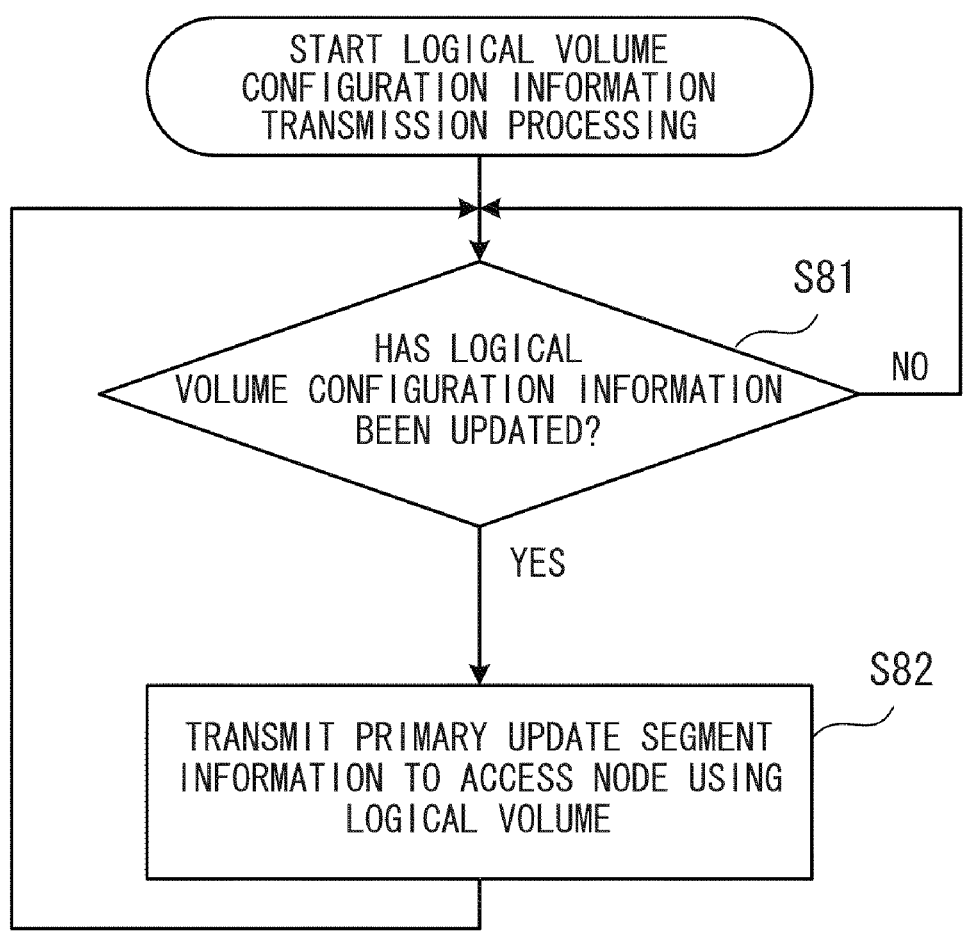
FIG. 27 is a diagram depicting logical volume configuration information transmission processing according to a second embodiment.

FIG. 27 is a diagram depicting logical volume configuration information transmission processing according to the second embodiment. The processing depicted in FIG. 27 is described below.

[Step S81] The configuration information change notification section 538 determines whether or not the logical volume configuration information 523 has been updated. When the logical volume configuration information 523 has been updated, the processing goes to step S82. When the logical volume configuration information 523 is not yet updated, the processing at step S81 is repeated.

[Step S82] With reference to the restoration target list 525a, the configuration information change notification section 538 determines a segment whose primary slice has been changed. From the logical volume configuration information 523, the configuration information change notification section 538 extracts solely the information concerning a segment whose primary slice has been updated, and then generates the primary update segment information. Further, with reference to the access node list 524a, the configuration information change notification section 538 determines an access node that uses the logical volume whose configuration has been changed. For example, in the access node list 524a depicted in FIG. 25, when the logical volume information concerning the logical volume ID "LVOL-X" is changed, the corresponding logical volume is used by the access node 600 of access node ID "AP#1". Thus, the configuration information change notification section 538 transmits, to the corresponding access node, the configuration information change notification including the primary update segment information.

Figure 28:
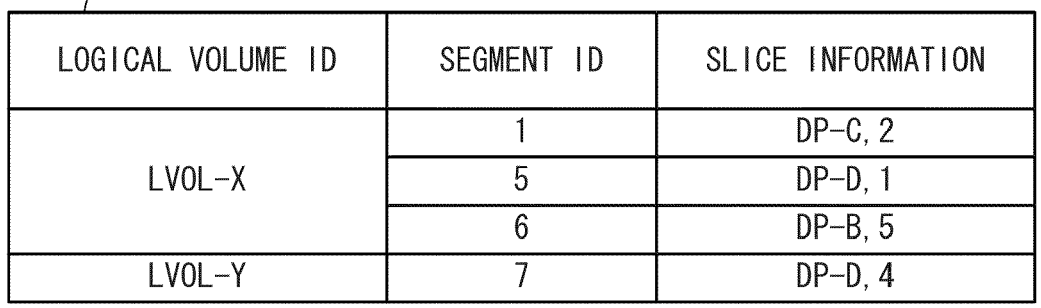
FIG. 28 is a diagram depicting primary update segment information in logical volume configuration information.

FIG. 28 is a diagram depicting the primary update segment information in the logical volume configuration information. FIG. 28 depicts the primary update segment information 523a obtained when the logical volume configuration information is updated by recovery processing depicted in FIG. 6. The primary update segment information 523a is notified to the access node 600 by the push-type method.

The access node 600 having received the primary update segment information 523a performs logical volume update processing.

Figure 29:
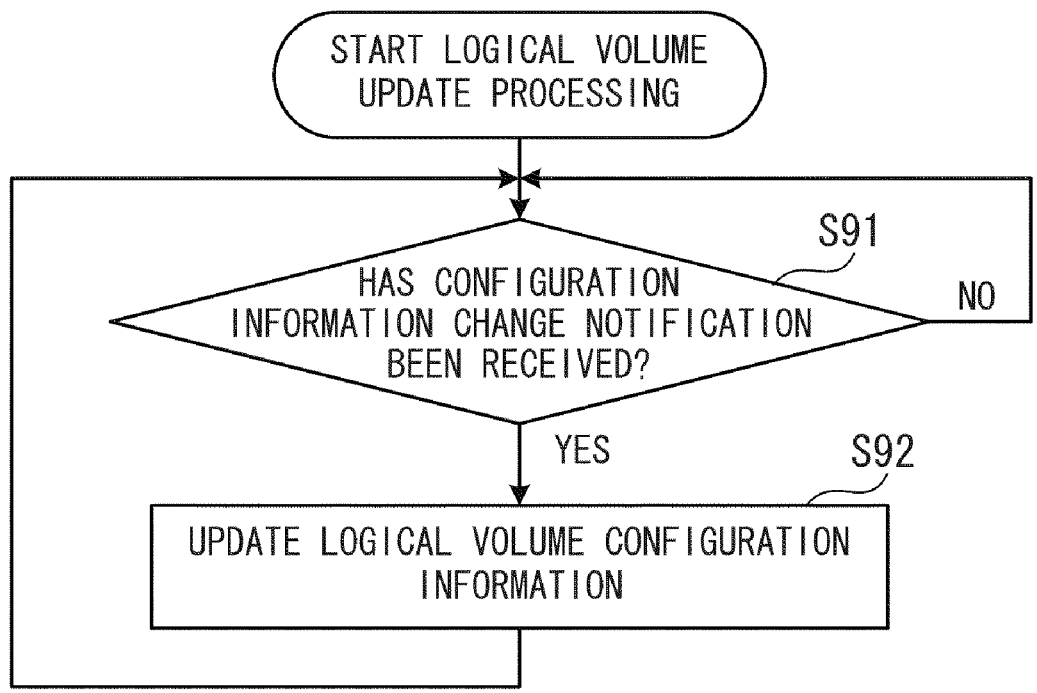
FIG. 29 is a flow chart depicting a procedure of logical volume update processing according to a second embodiment.

FIG. 29 is a flow chart depicting a procedure of logical volume update processing according to the second embodiment. The processing depicted in FIG. 29 is described below.

[Step S91] The configuration change notification reception section 636 of the access node 600 determines whether a configuration information change notification has been received from the control node 500. When a configuration information change notification has been received, the processing goes to step S92. When a configuration information change notification is not yet received, the processing at step S91 is repeated.

[Step S92] Based on the primary update segment information 523a included in the received configuration information change notification, the configuration change notification reception section 636 updates the logical volume configuration information 621 held by the access node 600. That is, the configuration change notification reception section 636 updates the slice information corresponding to the segment indicated by the primary update segment information 523a into the slice information indicated by the primary update segment information 523a. Then, the processing goes to step S91.

As such, with push-type communication, the logical volume configuration information 621 of the access node 600 may be updated timely. Further, only contents concerning a change are transmitted, and hence the amount of communication data is reduced. Furthermore, since the information of the logical volumes used by the individual access nodes is administered by the control node 500, the logical volume configuration information may be transmitted only to an access node that uses the logical volume whose configuration has been changed. This avoids occurrence of unnecessary communication, and hence reduces the amount of communication through the network 10.

[Other Applications]

The description so far has been given for an exemplary case that the configuration of a logical volume is changed when a fault occurs in a disk node. However, the configuration of a logical volume may be changed by other reasons. For example, when a disk node is to be stopped for maintenance, the data administered by the disk node may be saved. Thus, before the stop, slices are to be re-allocated to the segments to which slices in the disk node have been allocated. Further, in some cases, slice re-allocation is to be performed for equalization of access from a logical volume to a plurality of disk nodes. Even in these cases, the first and the second embodiments described above permit efficient update of the logical volume configuration information in the access nodes 600 and 700.

Here, the above-mentioned processing function may be implemented by computers. In this case, programs are provided that describe the contents of processing of the functions of the disk nodes 100, 200, 300, and 400, the control node 500, and the access nodes 600 and 700. Then, when the programs are executed by the computers, the above-mentioned processing functions are implemented on the computers. The programs describing the contents of processing may be recorded on a computer-readable recording medium. Such computer-readable recording media include magnetic storage devices, optical disks, magneto-optical recording media, semiconductor memories, or the like. Such magnetic storage devices include hard disk drives (HDDs), flexible disks (FDs), magnetic tapes, or the like. Optical disks include DVDs, DVD-RAMS, and CD-ROM/RWs. Magneto-optical recording media include MOs (Magneto-Optical discs) or the like.

When the programs are to be circulated, for example, a portable recording medium such as a DVD and a CD-ROM on which the programs are recorded is sold. Further, the programs may be stored in a storage unit of a server computer, and then the programs may be transferred from the server computer to other computers via a network.

For example, each computer for executing a program stores, into a local storage unit, a program recorded on a portable recording medium or a program transferred from the server computer. Then, the computer reads the program from the local storage unit, and then executes the processing according to the program. Here, the computer may read the program directly from the portable recording medium, and then execute the processing according to the program. Further, at each time when a program is transferred from the server computer, the computer may successively execute the processing according to the received program.

Embodiments have been illustrated above. However, components of the individual sections according to the embodiments may be replaced by other components having similar functions. Further, other arbitrary structures and other processing steps may be added. Furthermore, two or more arbitrary structures (features) according to the embodiments described above may be combined.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A recording medium storing a logical volume configuration information distribution program causing a computer to execute processing based on logical volume configuration information that defines a correspondence relation between a virtual storage area in a logical volume defined virtually and a real storage area in a storage unit, the logical volume configuration information is provided via a network to an access node that accesses the real storage area in response to an access request that specifies data in the virtual storage area, wherein the logical volume configuration information distribution program causes a computer to execute a process comprising:

changing the correspondence relation between the virtual storage area of the logical volume and the real storage area in the storage unit in the logical volume configuration information; and referencing an access node list storage unit storing an access node list in which identification information of the access node is registered, and transmitting update information that indicates an updated correspondence relation concerning the virtual storage area whose correspondence relation with the real storage area has been changed, to the access node indicated in the access node list, via the network when the correspondence relation between the virtual storage area and the real storage area is changed, wherein the logical volume identification information used by the access node is set in the access node list, and wherein a load distribution program stored in the recording medium causes the computer to execute a process comprising:

referencing the access node list, and transmitting the update information only to an access node that uses the logical volume whose correspondence relation between the virtual storage area and the real storage area has been changed when the update information is to be transmitted.

2. The recording medium according to claim 1, the process comprising:

registering, into the access node list, identification information of another access node having transmitted a heart beat when the heart beat from another access node not registered in the access node list is received.

3. The recording medium according to claim 2, wherein a load distribution program stored in the recording medium causes the computer to execute a process comprising:

deleting, from the access node list, identification information of an access node whose heart beat has stopped when a heart beat from an access node registered in the access node list has stopped for a specific time or longer.

4. The recording medium according to claim 1, wherein a load distribution program stored in the recording medium causes the computer to execute a process comprising:

transmitting a configuration information change notification to the access node indicated in the access node list when the correspondence relation between the virtual storage area and the real storage area is changed; and transmitting the update information to the access node having outputted the reference request when a reference request for the logical volume configuration information is received from an access node, transmitting the update information to an access node having outputted the reference request.

5. The recording medium according to claim 1, wherein a load distribution program stored in the recording medium causes the computer to further execute:

when the logical volume configuration information of a primary real storage area serving as an accessing target from the access node and the logical volume configuration information of a secondary real storage area for storing a copy of data stored in the primary real storage area are stored in association with each other in a common virtual storage area, extracting, from the logical volume configuration information, the updated correspondence relation between the virtual storage area and the primary real storage area so as to generate the update information.

6. The recording medium according to claim 1, wherein a load distribution program stored in the recording medium causes the computer to further execute:

when the correspondence relation between the virtual storage area and the real storage area is changed, updating the logical volume configuration information stored in a logical volume configuration information storage unit in response to contents of the change, and extracting, from the logical volume configuration information storage unit, a changed correspondence relation between the virtual storage area and the real storage area so as to generate the update information.

7. A logical volume configuration information distribution method causing a computer to execute processing based on logical volume configuration information that defines a correspondence relation between a virtual storage area in a logical volume defined virtually and a real storage area in a storage unit, the logical volume configuration information is provided via a network to an access node that accesses the real storage area in response to an access request that specifies data in the virtual storage area, the method comprising:

changing, by the computer, the correspondence relation between the virtual storage area of the logical volume and the real storage area in the storage unit in the logical volume configuration information; and referencing an access node list storage unit storing an access node list in which identification information of the access node is registered, and transmitting, by the computer, update information that indicates an updated correspondence relation concerning the virtual storage area whose correspondence relation with the real storage area has been changed, to the access node indicated in the access node list, via the network when the correspondence relation between the virtual storage area and the real storage area is changed, wherein the logical volume identification information used by the access node is set in the access node list, and wherein a load distribution program stored in the recording medium causes the computer to execute a process comprising:

referencing the access node list, and transmitting the update information only to an access node that uses the logical volume whose correspondence relation between the virtual storage area and the real storage area has been changed when the update information is to be transmitted.

8. A logical volume configuration information distribution apparatus comprising:

a processor; and a memory which stores a plurality of instructions, which when executed by the processor, cause the processor to execute, changing a correspondence relation between a virtual storage area of a logical volume and a real storage area of logical volume configuration information, and transmitting, when the correspondence relation between the virtual storage area and the real storage area is changed, update information that indicates an updated correspondence relation concerning the virtual storage area whose correspondence relation with the real storage area has been changed, to an access node that accesses the real storage area in response to an access request that specifies data in the virtual storage area, the access node indicated in an access node list, in which identification information of the access node is registered, via a network, and wherein the logical volume identification information used by the access node is set in the access node list, and wherein a load distribution program stored in the memory causes the processor to execute a process comprising:

referencing the access node list, and transmitting the update information only to an access node that uses the logical volume whose correspondence relation between the virtual storage area and the real storage area has been changed when the update information is to be transmitted.

* * * * *